United States Patent
Kutscha et al.

(10) Patent No.: US 11,806,832 B2
(45) Date of Patent: Nov. 7, 2023

(54) METHOD AND SYSTEM FOR DETERMINING A LEVEL OF A SANDING SURFACE PREPARATION OF A CARBON FIBER COMPOSITE SURFACE PRIOR TO A POST-PROCESSING OPERATION

(71) Applicant: The Boeing Company, Arlington, VA (US)

(72) Inventors: Eileen O. Kutscha, Seattle, WA (US); Kay Y. Blohowiak, Issaquah, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/173,016

(22) Filed: Feb. 22, 2023

(65) Prior Publication Data

US 2023/0211460 A1  Jul. 6, 2023

Related U.S. Application Data

(63) Continuation of application No. 16/274,184, filed on Feb. 12, 2019.

(51) Int. Cl.
*G01N 21/35* (2014.01)
*B24B 49/12* (2006.01)
(Continued)

(52) U.S. Cl.
CPC ......... *B24B 49/12* (2013.01); *G01N 21/3563* (2013.01); *G01N 2021/3595* (2013.01);
(Continued)

(58) Field of Classification Search
USPC .......................................................... 451/6
See application file for complete search history.

(56) References Cited

U.S. PATENT DOCUMENTS

| 5,393,980 A * | 2/1995 | Yost ....................... G01N 21/33 250/307 |
| 7,075,086 B2 * | 7/2006 | Shelley .................. G01N 21/55 250/559.11 |

(Continued)

OTHER PUBLICATIONS

Kai Brune, et al., "Surface Analytical Approaches Contributing to Quality Assurance During Manufacture of Functional Interfaces", Applied Adhesion Science, 2015, p. 1-17, 3:2, Springer, Berlin, Germany.

(Continued)

*Primary Examiner* — Mikhail Itskovich

(57) ABSTRACT

There is provided a quantitative method for determining a level of a sanding surface preparation of a carbon fiber composite surface, prior to the carbon fiber composite surface undergoing a post-processing operation. The quantitative method includes fabricating a ladder panel of levels of sanding correlating to an amount of sanding of sanding surface preparation standards for a reference carbon fiber composite surface of reference carbon fiber composite structure(s); using surface analysis tools to create target values for quantifying the levels of sanding; measuring, with the surface analysis tools, sanding surface preparation location(s) on the carbon fiber composite surface of a test carbon fiber composite structure, to obtain test result measurement(s); comparing the test result measurement(s) to the levels, to obtain test result level(s); determining if the test result level(s) meet the target values; and determining whether the carbon fiber composite surface is acceptable to proceed with the post-processing operation.

20 Claims, 18 Drawing Sheets

(51) Int. Cl.
*G01N 21/3563* (2014.01)
*G01N 21/84* (2006.01)
(52) U.S. Cl.
CPC ............... *G01N 2021/8411* (2013.01); *G01N 2021/8444* (2013.01); *G01N 2021/8472* (2013.01)

(56) References Cited

U.S. PATENT DOCUMENTS

| | | |
|---|---|---|
| 7,157,717 B2 | 1/2007 | Shelley et al. |
| 9,591,273 B1 | 3/2017 | Wu et al. |
| 2019/0033231 A1* | 1/2019 | Connell ............... H05H 1/0037 |

OTHER PUBLICATIONS

Brenda M. Parker, et al., Abstract for "Testing Epoxy Composite Surfaces for Bondability", Surface and Interface Analysis, Jun. 16, 1991, p. 471-476, vol. 17, No. 17, Elsevier Inc., Amsterdam, Netherlands.

C.D. Wingard, et al., Abstract for "Use of Photo-Electron Emission to Determine the Effects of Contamination on Bond Strength and Integrity of Metal/Polymer Composite Specimen", Polymeric Materials Science and Engineering, Proceedings of the ACS Division of Polymeric Materials Science and Engineering, 1991, p. 389-390, vol. 64, Elsevier Inc., Amsterdam, Netherlands.

Birgit K. Storm, et al., Abstract for "Wear Test of Composites", Academic Journal of Manufacturing Engineering, 2010, p. 91-96, vol. 8, No. 4, Elsevier Inc., Amsterdam, Netherlands.

Kanad Pala, et la., Abstract for "Evaluation of the Surface Hardness, Roughness, Gloss and Color of Composites After Different Finishing/Polishing Treatments and Thermocycling Using a Multitechnique Approach", Dental Materials Journal, Mar. 31, 2016, p. 278-289, vol. 35, No. 2, Elsevier Inc., Amsterdam, Netherlands.

Eileen O. Kutscha, et al., "Robust Bonding Through Process Control", SAMPE Proceedings, Long Beach, California, May 2018, p. 1-16.

* cited by examiner

METHOD AND SYSTEM FOR DETERMINING A LEVEL OF A SANDING SURFACE PREPARATION OF A CARBON FIBER COMPOSITE SURFACE PRIOR TO A POST-PROCESSING OPERATION

CROSS-REFERENCE TO RELATED APPLICATION

The present application is a continuation application and claims priority to pending application Ser. No. 16/274,184, filed Feb. 12, 2019, the entire contents of which is incorporated herein by reference.

REFERENCE TO GOVERNMENT CONTRACT

This invention was made with Government support under contract number NNL09AA00A NASA ACC 2C26 awarded by NASA. The government has certain rights in this invention.

BACKGROUND

1) Field of the Disclosure

The disclosure relates generally to methods and systems for process control in the manufacture of composite structures, and more particularly, to methods and systems for process control of abrasive surface preparation of composite structures, prior to undergoing post-processing operations, such as bonding or painting.

2) Description of Related Art

High performance applications for bonded composite structures, such as composite panels made of carbon fiber epoxy composite material or another suitable composite material, requires assurance of proper surface preparation prior to bonding. For example, proper surface preparation may include sanding of the composite surface prior to bonding, and verifying that the sanding occurred, and that the sanding was performed correctly, to avoid over sanding or under sanding of the composite surface.

Known methods and systems exist for verifying proper surface preparation of sanded surfaces. However, such known methods and systems may rely on inspection of a visual characteristic such as gloss level, i.e., "gloss removed" assessment, of the sanded surface. Such visual inspection is typically subjective in nature and not quantitative, and may result in inconsistent and unreliable surface preparation and process control, such as bond process control, which may, in turn, affect the quality of bonding of the composite surface to another structure.

Thus, it would be advantageous to have a method and a system that take into account one or more of the issues discussed above, that provide a quantitative method and system for ensuring consistent and reliable abrasive surface preparation for a composite surface, prior to the composite surface undergoing a post-processing operation, such as bonding or painting, that ensures the quality of subsequent adhesive bonding, and that provide advantages over known methods and systems.

SUMMARY

Example implementations of the present disclosure provide for methods and a system for determining a quality of an abrasive surface preparation of a composite surface, prior to undergoing a post-processing operation, and that provide significant advantages over existing methods and systems.

In one version there is provided a method for determining a quality of an abrasive surface preparation of a composite surface, prior to the composite surface undergoing a post-processing operation. The method comprises fabricating a plurality of levels of abrasive surface preparation standards for a reference composite surface of one or more reference composite structures. The method further comprises using one or more surface analysis tools to create one or more target values for quantifying each of the plurality of levels of the abrasive surface preparation standards.

The method further comprises measuring, with the one or more surface analysis tools, one or more abrasive surface preparation locations on the composite surface of a test composite structure, to obtain one or more test result measurements. The method further comprises comparing each of the one or more test result measurements to the plurality of levels of the abrasive surface preparation standards, to obtain one or more test result levels of the abrasive surface preparation of the test composite structure.

The method further comprises determining if the one or more test result levels of the abrasive surface preparation meet the one or more target values, to determine the quality of the abrasive surface preparation of the composite surface. The method further comprises determining whether the composite surface of the test composite structure is acceptable to proceed with undergoing the post-processing operation.

In another version there is provided a quantitative method for determining a quality of a sanding surface preparation of a carbon fiber composite surface, prior to bonding the carbon fiber composite surface to a structure. The quantitative method comprises fabricating a plurality of levels of sanding surface preparation standards for a reference carbon fiber composite surface of one or more reference carbon fiber composite structures. The quantitative method further comprises using one or more surface analysis tools to create one or more target values for quantifying each of the plurality of levels of the sanding surface preparation standards, wherein the one or more surface analysis tools comprise a Fourier transform infrared (FTIR) spectrometer, an optically stimulated electron emission (OSEE) sensor, a gloss meter, a colorimeter, and an optical interferometer.

The quantitative method further comprises measuring, with the one or more surface analysis tools, one or more sanding surface preparation locations on the carbon fiber composite surface of a test carbon fiber composite structure, to obtain one or more test result measurements. The quantitative method further comprises comparing each of the one or more test result measurements to the plurality of levels of the sanding surface preparation standards, to obtain one or more test result levels of the sanding surface preparation of the test carbon fiber composite structure.

The quantitative method further comprises determining if the one or more test result levels of the sanding surface preparation meet the one or more target values, to determine the quality of the sanding surface preparation of the carbon fiber composite surface. The quantitative method further comprises determining whether the carbon fiber composite surface of the test carbon fiber composite structure is acceptable to proceed with bonding to the structure.

In another version there is provided a system for determining a quality of an abrasive surface preparation of a composite surface, prior to the composite surface undergoing a post-processing operation. The system comprises a reference composite structure having a reference composite surface. The system further comprises a plurality of levels of abrasive surface preparation standards fabricated for the reference composite surface.

The system further comprises a test composite structure having the composite surface, and the composite surface having one or more abrasive surface preparation locations that have been abraded with an abrading device. The system further comprises one or more surface analysis tools, to create one or more target values for quantifying each of the plurality of levels of the abrasive surface preparation standards. The one or more surface analysis tools are configured to measure the one or more abrasive surface preparation locations, to obtain one or more test result measurements.

Each of the one or more test result measurements is compared to the plurality of levels of the abrasive surface preparation standards, to obtain one or more test result levels of the abrasive surface preparation of the test composite structure, and to determine if the one or more test result levels meet the one or more target values, to determine the quality of the abrasive surface preparation of the composite surface, and to determine if the composite surface is acceptable to proceed with undergoing the post-processing operation.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary version, but which are not necessarily drawn to scale, wherein.

The figures shown in this disclosure represent various aspects of the embodiments presented, and only differences will be discussed in detail.

DETAILED DESCRIPTION

Disclosed versions or embodiments will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

Figure 1:
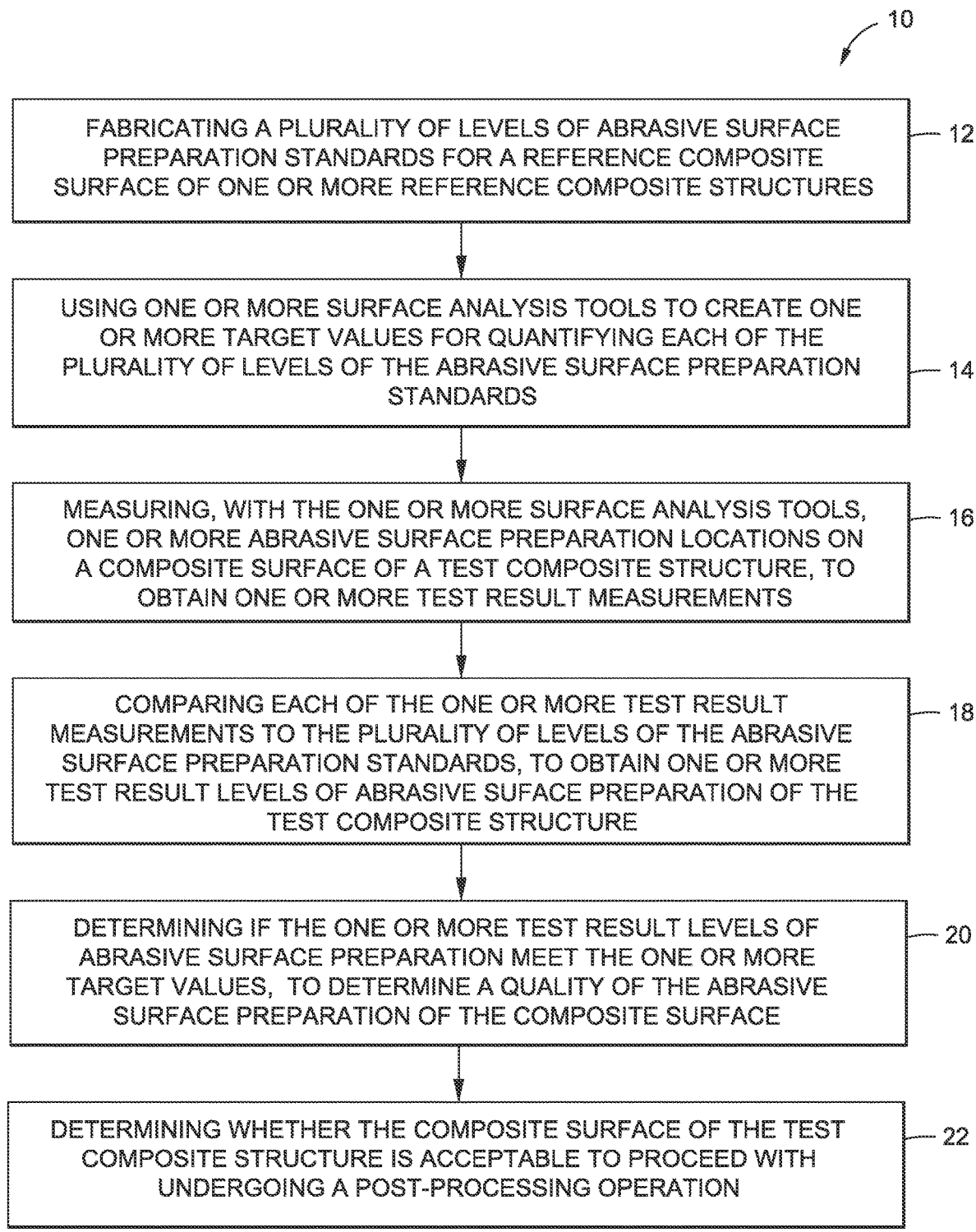
FIG. 1 is an illustration of a flowchart of steps of an exemplary version of a method of the disclosure.
Figure 2:
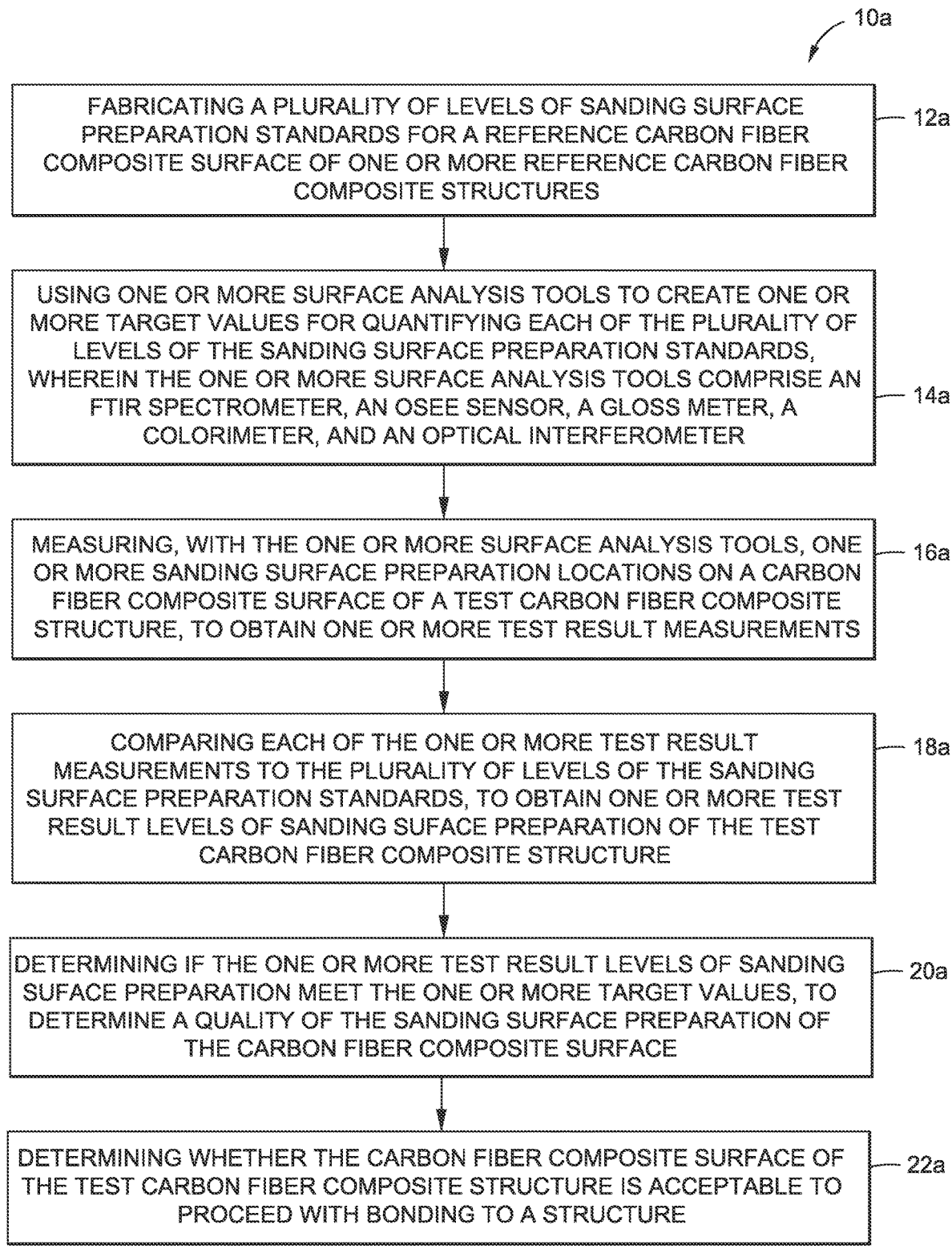
FIG. 2 is an illustration of a flowchart of steps of another exemplary version of a method of the disclosure.
Figure 3:
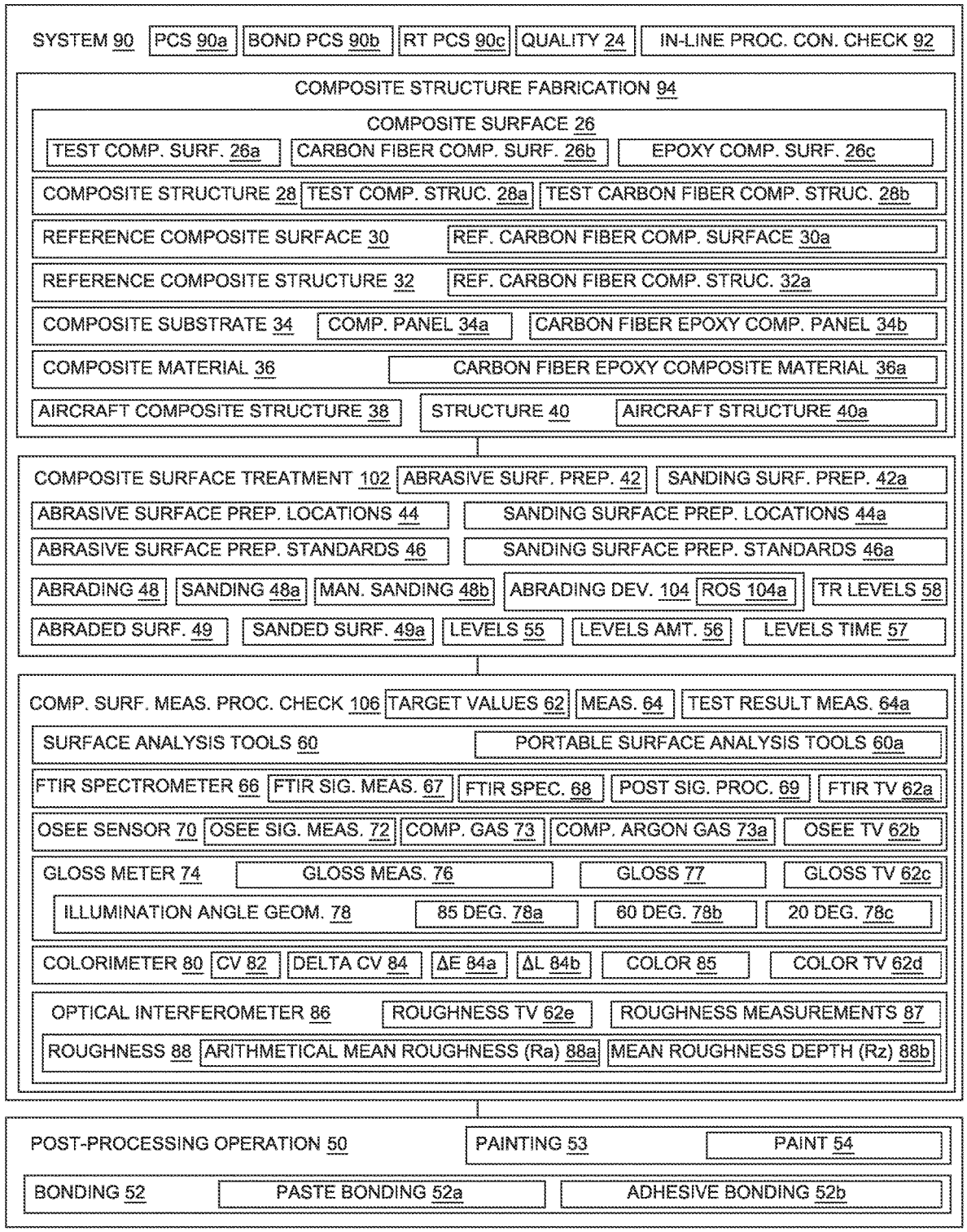
FIG. 3 is an illustration of a functional block diagram showing an exemplary version of a system of the disclosure.

Now referring to the Figures, FIG. 1 is an illustration of a flowchart of steps of an exemplary version of a method 10 of the disclosure, FIG. 2 is an illustration of a flowchart of steps of an exemplary version of a quantitative method 10a of the disclosure, and FIG. 3 is an illustration of a functional block diagram showing an exemplary version of a system 90 of the disclosure.

The blocks in FIGS. 1-3 represent operations and/or portions thereof, or elements, and lines connecting the various blocks do not imply any particular order or dependency of the operations or portions thereof, or elements. FIGS. 1 and 2 and the disclosure of the steps of the method 10 and the quantitative method 10a, respectively, set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 1, in one version, there is provided the method 10 for determining a quality 24 (see FIG. 3) of an abrasive surface preparation 42 (see FIG. 3) of a composite surface 26 (see FIG. 3), prior to the composite surface 26 undergoing a post-processing operation 50 (see FIG. 3). The abrasive surface preparation 42 may comprise a sanding surface preparation 42a (see FIG. 3), a grit blasting surface preparation, a nylon pad abrasive surface preparation, or another suitable abrasive surface preparation with an abrasive media tool that physically abrades the composite surface 26. As shown in FIG. 1, the method 10 comprises step 12 of fabricating a plurality of levels 55 (see FIG. 3) of abrasive surface preparation standards 46 (see FIG. 3) for a reference composite surface 30 (see FIG. 3) of one or more reference composite structures 32 (see FIG. 3).

As shown in FIG. 1, the method 10 further comprises step 14 of using one or more surface analysis tools 60 (see FIG. 3), to create one or more target values 62 (see FIG. 3) for quantifying each of the plurality of levels 55 of the abrasive surface preparation standards 46. As shown in FIG. 1, the method 10 further comprises step 16 of measuring, with the one or more surface analysis tools 60, one or more abrasive surface preparation locations 44 (see FIG. 3) on the composite surface 26 (see FIG. 3) of a test composite structure 28a (see FIG. 3), to obtain one or more test result measurements 64a (see FIG. 3).

The test composite structure 28a and the one or more reference composite structures 32 may comprise a composite substrate 34 (see FIG. 3), such as in the form of a composite panel 34a (see FIG. 3), for example, a carbon fiber epoxy composite panel 34b (see FIG. 3), or another suitable type of composite panel 34a. The test composite structure 28a and the one or more reference composite structures 32 are preferably made of a composite material 36 (see FIG. 3), for example, a carbon fiber epoxy composite material 36a (see FIG. 3), or another suitable type of composite material 36. As shown in FIG. 3, the test composite structure 28a and the one or more reference composite structures 32 may be fabricated or manufactured with a composite structure fabrication 94.

The step 16 (see FIG. 1) of measuring, with the one or more surface analysis tools 60, preferably comprises measuring one or more abrasive surface preparation locations 44 on the composite surface 26 of the test composite structure 28a, where the test composite structure 28a comprises a carbon fiber epoxy composite panel 34b (see FIG. 3).

The step 16 (see FIG. 1) of measuring, with the one or more surface analysis tools 60, may further comprise measuring with the surface analysis tool 60 comprising a Fourier transform infrared (FTIR) spectrometer 66 (see FIG. 3), to measure one or more Fourier transform infrared (FTIR) signal measurements 67 (see FIG. 3) of the abrasive surface preparation location(s) 44 of the composite surface 26. The Fourier transform infrared (FTIR) spectrometer 66 uses a Fourier transform infrared (FTIR) spectroscopy process 68 (see FIG. 3) to obtain an infrared (IR) spectra of absorption or emission of the abrasive surface preparation location(s) 44 of the composite surface 26 of the test composite structure 28a. The FTIR spectroscopy process 68 preferably exposes the abrasive surface preparation locations(s) 44 of the composite surface 26 to an infrared (IR) light source that is reflected onto a detector, which precisely measures the amount of light absorbed by the abrasive surface preparation location 44 of the composite surface 26. The FTIR spectrometer 66 is able to detect a test result level 58 of the abrasive surface preparation 42, including a composite surface treatment 102 (see FIG. 4), of the test composite structure 28a. The FTIR spectroscopy process 68 may further require a post signal processing 69 (see FIG. 3).

The step 16 (see FIG. 1) of measuring, with the one or more surface analysis tools 60, may further comprise measuring with the surface analysis tool 60 comprising an optically stimulated electron emission (OSEE) sensor 70, to measure one or more optically stimulated electron emission (OSEE) signal measurements 72, of the abrasive surface preparation location(s) 44 of the composite surface 26. The OSEE sensor 70 uses ultraviolet (UV) light to create electron emission from the abrasive surface preparation location(s) 44 of the composite surface 26, resulting in a small current detected by the OSEE sensor 70. The OSEE sensor 70 may require a compressed gas 73 (see FIG. 3), such as a compressed argon gas 73a (see FIG. 3), to function.

The step 16 (see FIG. 1) of measuring, with the one or more surface analysis tools 60, may further comprise measuring with the surface analysis tool 60 comprising a gloss meter 74, to measure one or more gloss measurements 76 of gloss 77 at one or more gloss illumination angle geometries 78 of the abrasive surface preparation location(s) 44 of the composite surface 26. The gloss illumination angle geometries 78 may comprise an 85 (eighty-five) degree gloss illumination angle geometry 78a (see FIG. 3), a 60 (sixty) degree gloss illumination angle geometry 78b (see FIG. 3), a 20 (twenty) degree gloss illumination angle geometry 78c (see FIG. 3), or another suitable gloss illumination angle geometry 78. Preferably, the gloss meter 74 measures the one or more gloss measurements 76 of gloss 77 at the gloss illumination angle geometry 78 comprising the 85 (eighty-five) degree gloss illumination angle geometry 78a. The gloss meter 74 measuring the gloss measurement 76 of gloss 77 at the 85 (eighty-five) degree gloss illumination angle geometry 78a is able to detect the test result level 58 of the abrasive surface preparation 42 of the test composite structure 28a.

The step 16 (see FIG. 1) of measuring, with the one or more surface analysis tools 60, may further comprise measuring with the surface analysis tool 60 comprising a colorimeter 80 (see FIG. 3), to measure color 85 (see FIG. 3), such as one or more color values 82 (see FIG. 3), including one or more delta color values 84 (see FIG. 3), for example, a delta E* ($\Delta E^*$) color value 84a (see FIG. 3) and a delta L* ($\Delta L^*$) color value 84b (see FIG. 3), of the abrasive surface preparation location(s) 44 of the composite surface 26. The colorimeter 80 measuring the delta color values 84 of the delta E* ($\Delta E^*$) color value 84a and the delta L* ($\Delta L^*$) color value 84b is able to detect the test result level 58 of the abrasive surface preparation 42 of the test composite structure 28a.

The step 16 (see FIG. 1) of measuring, with the one or more surface analysis tools 60, may further comprise measuring with the surface analysis tool 60 comprising an optical interferometer 86, to measure one or more roughness measurements 87 of roughness 88 of the abrasive surface preparation location(s) 44 of the composite surface 26. The roughness 88 is preferably an arithmetical mean roughness (Ra) 88a (see FIG. 3) and a mean roughness depth (Rz) 88b (see FIG. 3). The optical interferometer 86 measuring the roughness measurements 87 is able to detect the test result level 58 of the abrasive surface preparation 42, including the composite surface treatment 102 (see FIG. 4), of the test composite structure 28a.

As shown in FIG. 1, the method 10 further comprises step 18 of comparing each of the one or more test result measurements 64a to the plurality of levels 55 of the abrasive surface preparation standards 46, to obtain the one or more test result levels 58 (see FIG. 3) of the abrasive surface preparation 42, of the test composite structure 28a.

As shown in FIG. 1, the method 10 further comprises step 20 of determining if the one or more test result levels 58 of the abrasive surface preparation 42 meet the one or more target values 62, to determine the quality 24 (see FIG. 3) of the abrasive surface preparation 42 of the composite surface 26. Preferably, a Fourier transform infrared (FTIR) target value 62*a* (see FIG. 3) comprises a peak area under a curve that is less than 7 (seven) for measuring a composite surface 26, such as an epoxy composite surface 26*c* (see FIG. 3). Preferably, an optically stimulated electron emission (OSEE) target value 62*b* (see FIG. 3) comprises an optically stimulated electron emission (OSEE) signal measurement 72 of about 100 (one hundred) for measuring a composite surface 26, such as an epoxy composite surface 26*c* (see FIG. 3).

Preferably, a gloss target value 62*c* (see FIG. 3) for the 85 (eighty-five) degree gloss illumination angle geometry 78*a* is less than 12 (twelve) for measuring a composite surface 26, such as an epoxy composite surface 26*c* (see FIG. 3). Preferably, a color target value 62*d* (see FIG. 3) for the delta E* (ΔE*) color value 84*a* (see FIG. 3) is as close to 0 (zero) as possible for measuring a composite surface 26, such as an epoxy composite surface 26*c* (see FIG. 3). Preferably, a roughness target value 62*e* (see FIG. 3) using the optical interferometer 86 comprises a correlation coefficient greater than 98% (ninety-eight percent) for measuring a composite surface 26, such as an epoxy composite surface 26*c* (see FIG. 3).

As shown in FIG. 1, the method 10 further comprises step 22 of determining whether the composite surface 26 of the test composite structure 28*a* is acceptable to proceed with undergoing the post-processing operation 50 (see FIG. 3). The step 22 of determining whether the composite surface 26 of the test composite structure 28*a* is acceptable to proceed with undergoing the post-processing operation 50 may comprise determining whether the composite surface 26 is acceptable to proceed with undergoing the post-processing operation 50 comprising bonding 52 (see FIG. 3) the composite surface 26 to a structure 40 (see FIG. 3). The bonding 52 may include paste bonding 52*a* (see FIG. 3), adhesive bonding 52*b* (see FIG. 3), or another suitable type of bonding 52, of the composite surface 26 to the structure 40. The structure 40 may comprise an aircraft structure 40*a* or another suitable structure 40.

Alternatively, the step 22 of determining whether the composite surface 26 of the test composite structure 28*a* is acceptable to proceed with undergoing the post-processing operation 50 may comprises determining whether the composite surface 26 is acceptable to proceed with undergoing the post-processing operation 50 comprising painting 53 (see FIG. 3) the composite surface 26 with a paint 54 (see FIG. 3).

In another version, there is provided the quantitative method 10*a* (see FIG. 2) for determining a quality 24 (see FIG. 3) of a sanding surface preparation 42*a* (see FIG. 3) of a carbon fiber composite surface 26*b* (see FIG. 3), prior to bonding 52 (see FIG. 3) the carbon fiber composite surface 26*b* to a structure 40 (see FIG. 3), such as an aircraft structure 40*a* (see FIG. 3). As shown in FIG. 2, the quantitative method 10*a* comprises step 12*a* of fabricating a plurality of levels 55 (see FIG. 3) of sanding surface preparation standards 46*a* (see FIG. 3) for a reference carbon fiber composite surface 30*a* (see FIG. 3) of one or more reference carbon fiber composite structures 32*a* (see FIG. 3).

As shown in FIG. 2, the quantitative method 10*a* further comprises step 14*a* of using one or more surface analysis tools 60 (see FIG. 3) to create one or more target values 62 (see FIG. 3) for quantifying each of the plurality of levels 55 (see FIG. 3) of the sanding surface preparation standards 46*a* (see FIG. 3). The one or more surface analysis tools 60 preferably comprise a Fourier transform infrared (FTIR) spectrometer 66 (see FIG. 3), an optically stimulated electron emission (OSEE) sensor 70 (see FIG. 3), a gloss meter 74 (see FIG. 3), a colorimeter 80 (see FIG. 3), and an optical interferometer 86 (see FIG. 3).

As shown in FIG. 2, the quantitative method 10*a* further comprises step 16*a* of measuring, with the one or more surface analysis tools 60, one or more sanding surface preparation locations 44*a* (see FIG. 3) on the carbon fiber composite surface 26*b* (see FIG. 3) of a test carbon fiber composite structure 28*b* (see FIG. 3), to obtain one or more test result measurements 64*a* (see FIG. 3).

The step 16*a* (see FIG. 2) of measuring, with the one or more surface analysis tools 60, may further comprise measuring with the surface analysis tool 60 comprising the FTIR spectrometer 66, to measure one or more Fourier transform infrared (FTIR) signal measurements 67 (see FIG. 3), of the sanding surface preparation location(s) 44*a* of the carbon fiber composite surface 26*b*. The FTIR spectrometer 66 uses the Fourier transform infrared (FTIR) spectroscopy process 68 to obtain the infrared (IR) spectra of absorption or emission of the sanding surface preparation location(s) 44*a* of the carbon fiber composite surface 26*b* of the test carbon fiber composite structure 28*b*. The FTIR spectroscopy process 68 preferably exposes the sanding surface preparation location(s) 44*a* of the carbon fiber composite surface 26*b* to the infrared (IR) light source that is reflected onto a detector, which precisely measures the amount of light absorbed by the sanding surface preparation location 44*a* of the carbon fiber composite surface 26*b*. The FTIR spectrometer 66 is able to detect the test result level 58 of the sanding surface preparation 42*a*, including the composite surface treatment 102 (see FIG. 4), of the test carbon fiber composite structure 28*b*. The FTIR spectroscopy process 68 may further require the post signal processing 69 (see FIG. 3).

The step 16*a* (see FIG. 2) of measuring, with the one or more surface analysis tools 60, may further comprise measuring with the surface analysis tool 60 comprising the OSEE sensor 70, to measure one or more optically stimulated electron emission (OSEE) signal measurements 72 of the sanding surface preparation location(s) 44*a* of the carbon fiber composite surface 26*b*. The OSEE sensor 70 uses ultraviolet (UV) light to create electron emission from the sanding surface preparation location(s) 44*a* of the carbon fiber composite surface 26*b*, resulting in a small current detected by the OSEE sensor 70. The OSEE sensor 70 may require compressed gas 73 (see FIG. 3), such as compressed argon gas 73*a* (see FIG. 3), to function.

The step 16*a* (see FIG. 2) of measuring, with the one or more surface analysis tools 60, may further comprise measuring with the surface analysis tool 60 comprising the gloss meter 74, to measure one or more gloss measurements 76 of gloss 77 at one or more gloss illumination angle geometries 78 of the sanding surface preparation location(s) 44*a* of the carbon fiber composite surface 26*b*. The gloss illumination angle geometries 78 may comprise the 85 (eighty-five) degree gloss illumination angle geometry 78*a* (see FIG. 3), the 60 (sixty) degree gloss illumination angle geometry 78*b* (see FIG. 3), the 20 (twenty) degree gloss illumination angle geometry 78*c* (see FIG. 3), or another suitable gloss illumination angle geometry 78. Preferably, the gloss meter 74 measures the one or more gloss measurements 76 of gloss 77 at the gloss illumination angle geometry 78 comprising the 85 (eighty-five) degree gloss illumination angle geometry 78*a*. The gloss meter 74 measuring the gloss measurement 76 of gloss 77 at the 85 (eighty-five) degree gloss illumination angle geometry 78*a* is able to detect the test result level 58 of the sanding surface preparation 42*a* of the test carbon fiber composite structure 28*b*.

The step 16a (see FIG. 2) of measuring, with the one or more surface analysis tools 60, may further comprise measuring with the surface analysis tool 60 comprising the colorimeter 80 (see FIG. 3), to measure color 85 (see FIG. 3), such as one or more color values 82 (see FIG. 3), including one or more delta color values 84 (see FIG. 3), for example, the delta E* (ΔE*) color value 84a (see FIG. 3) and the delta L* (ΔL*) color value 84b (see FIG. 3), of the sanding surface preparation location(s) 44a of the carbon fiber composite surface 26b. The colorimeter 80 measuring the delta color values 84 of the delta E* (ΔE*) color value 84a and the delta L* (ΔL*) color value 84b is able to detect the test result level 58 of the sanding surface preparation 42a of the test carbon fiber composite structure 28b.

The step 16a (see FIG. 2) of measuring, with the one or more surface analysis tools 60, may further comprise measuring with the surface analysis tool 60 comprising the optical interferometer 86, to measure one or more roughness measurements 87 of roughness 88 of the sanding surface preparation location(s) 44a of the carbon fiber composite surface 26b. The roughness 88 is preferably the arithmetical mean roughness (Ra) 88a (see FIG. 3) and the mean roughness depth (Rz) 88b (see FIG. 3). The optical interferometer 86 measuring the roughness measurements 87 is able to detect the test result level 58 of the sanding surface preparation 42a, including the composite surface treatment 102 (see FIG. 4), of the test carbon fiber composite structure 28b.

As shown in FIG. 2, the quantitative method 10a further comprises step 18a of comparing each of the one or more test result measurements 64a (see FIG. 3) to the plurality of levels 55 (see FIG. 3) of the sanding surface preparation standards 46a, to obtain one or more test result levels 58 (see FIG. 3) of the sanding surface preparation 42a (see FIG. 3) of the test carbon fiber composite structure 28b.

As shown in FIG. 2, the quantitative method 10a further comprises step 20a of determining if the one or more test result levels 58 of the sanding surface preparation 42a meet the one or more target values 62, to determine the quality 24 (see FIG. 3) of the sanding surface preparation 42a of the carbon fiber composite surface 26b. As discussed above, preferably, the FTIR target value 62a (see FIG. 3) comprises the peak area under a curve that is less than 7 (seven) for measuring a carbon fiber composite surface 26b, such as an epoxy composite surface 26c (see FIG. 3). Preferably, the OSEE target value 62b (see FIG. 3) comprises the OSEE signal measurement 72 of about 100 (one hundred) for measuring the carbon fiber composite surface 26b, such as the epoxy composite surface 26c (see FIG. 3).

Preferably, the gloss target value 62c (see FIG. 3) for the 85 (eighty-five) degree gloss illumination angle geometry 78a is less than 12 (twelve) for measuring the carbon fiber composite surface 26b, such as the epoxy composite surface 26c (see FIG. 3). Preferably, the color target value 62d (see FIG. 3) for the delta E* (ΔE*) color value 84a (see FIG. 3) is as close to 0 (zero) as possible for measuring the carbon fiber composite surface 26b, such as the epoxy composite surface 26c (see FIG. 3). Preferably, the roughness target value 62e (see FIG. 3) using the optical interferometer 86 comprises the correlation coefficient greater than 98% (ninety-eight percent) for measuring the carbon fiber composite surface 26b, such as the epoxy composite surface 26c (see FIG. 3).

As shown in FIG. 2, the quantitative method 10a further comprises step 22a of determining whether the carbon fiber composite surface 26b of the test carbon fiber composite structure 28b is acceptable to proceed with bonding 52 (see FIG. 3) to the structure 40 (see FIG. 3). The bonding 52 may include paste bonding 52a (see FIG. 3), adhesive bonding 52b (see FIG. 3), or another suitable type of bonding 52, of the composite surface 26 to the structure 40. The structure 40 may comprise an aircraft structure 40a or another suitable structure 40.

FIG. 3 shows an exemplary version of the system 90 of the disclosure. In another version, there is provided the system 90 for determining the quality 24 (see FIG. 3) of the abrasive surface preparation 42 (see FIG. 3), such as the sanding surface preparation 42a (see FIG. 3), of the composite surface 26 (see FIG. 3), prior to the composite surface 26 undergoing the post-processing operation 50 (see FIG. 3). The abrasive surface preparation 42 may comprise the sanding surface preparation 42a (see FIG. 3), a grit blasting surface preparation, a nylon pad abrasive surface preparation, or another suitable abrasive surface preparation with an abrasive media tool that physically abrades the composite surface 26. The post-processing operation 50 may comprise bonding 52 (see FIG. 3) to a structure 40 (see FIG. 3), such as an aircraft structure 40a (see FIG. 3). As shown in FIG. 3, the bonding 52 may comprise paste bonding 52a (see FIG. 3), adhesive bonding 52b (see FIG. 3), or another suitable type of bonding 52. As further shown in FIG. 3, the post-processing operation 50 may comprise painting 53 the composite surface 26 with paint 54.

As shown in FIG. 3, the system 90 preferably comprises a process control system (PCS) 90a, such as a bond process control system (PCS) 90b. As further shown in FIG. 3, the system 90 is preferably a real time (RT) process control system (PCS) 90c, and preferably the system 90 is automated for bond process control. As further shown in FIG. 3, the system 90 is preferably used in an in-line process control check 92 or monitoring.

As further shown in FIG. 3, the system 90 comprises a reference composite structure 32, such as a reference carbon fiber composite structure 32a, having a reference composite surface 30, such as a reference carbon fiber composite surface 30a.

As further shown in FIG. 3, the system 90 comprises a composite structure 28, such as a test composite structure 28a, for example, a test carbon fiber composite structure 28b. The composite structure 28, such as the test composite structure 28a, has the composite surface 26 (see FIG. 3), such as a test composite surface 26a (see FIG. 3). The composite surface 26, such as the test composite surface 26a, may comprise a carbon fiber composite surface 26b (see FIG. 3), such as an epoxy composite surface 26c (see FIG. 3), or another suitable type of composite surface 26.

The composite structure 28, such as the test composite structure 28a, and the reference composite structure 32 may comprise a composite substrate 34 (see FIG. 3), such as in the form of a composite panel 34a (see FIG. 3), for example, a carbon fiber epoxy composite panel 34b (see FIG. 3), or another suitable type of composite panel 34a. The composite structure 28, such as the test composite structure 28a, and the reference composite structure 32 may comprise an aircraft composite structure 38 (see FIG. 3), or another suitable type of composite structure 28, that may be bonded or painted. Further, the composite structure 28, such as the test composite structure 28a, and the reference composite structure 32 are preferably made of a composite material 36 (see FIG. 3), for example, a carbon fiber epoxy composite material 36a (see FIG. 3), or another suitable type of composite material 36. As shown in FIG. 3, the composite structure 28, such as the test composite structure 28a, and the reference composite structure 32 may be fabricated or manufactured with a composite structure fabrication 94.

Figure 6:
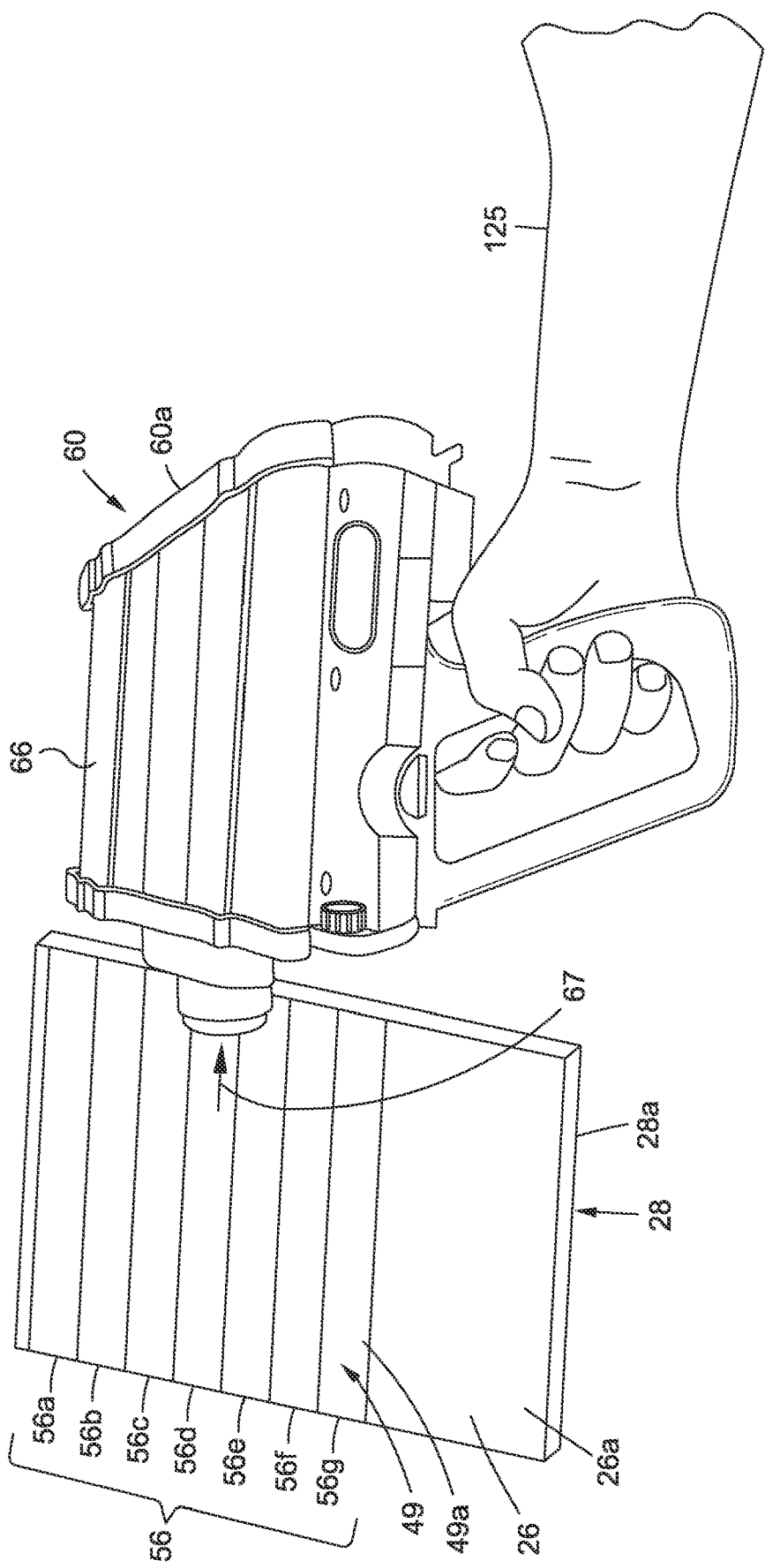
FIG. 6 is an illustration of a perspective side view of a Fourier transform infrared (FTIR) spectrometer in use by a user taking Fourier transform infrared (FTIR) signal be of an abraded surface of a composite structure.
Figure 8:
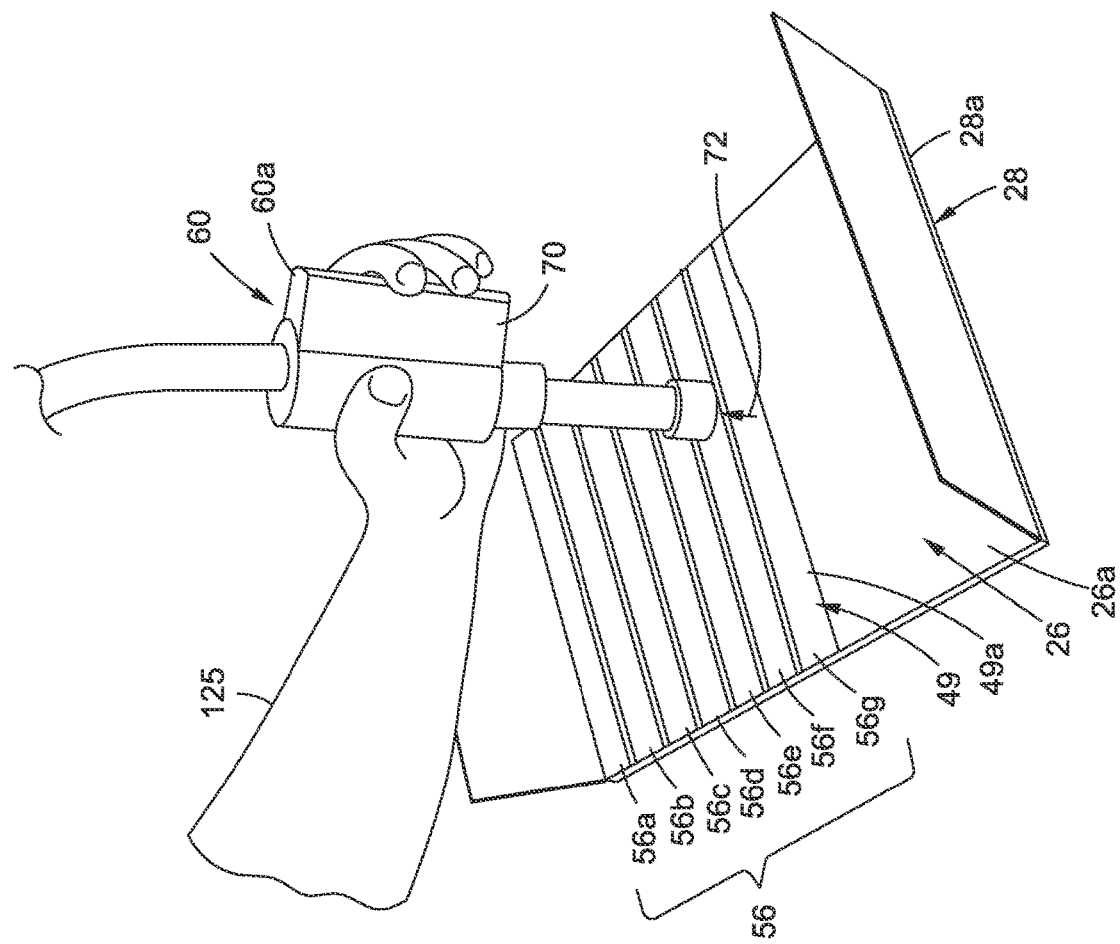
FIG. 8 is an illustration of a perspective side view of an optically stimulated electron emission (OSEE) sensor in use by a user taking optically stimulated electron emission (OSEE) signal measurements of an abraded surface of a composite structure.
Figure 9:
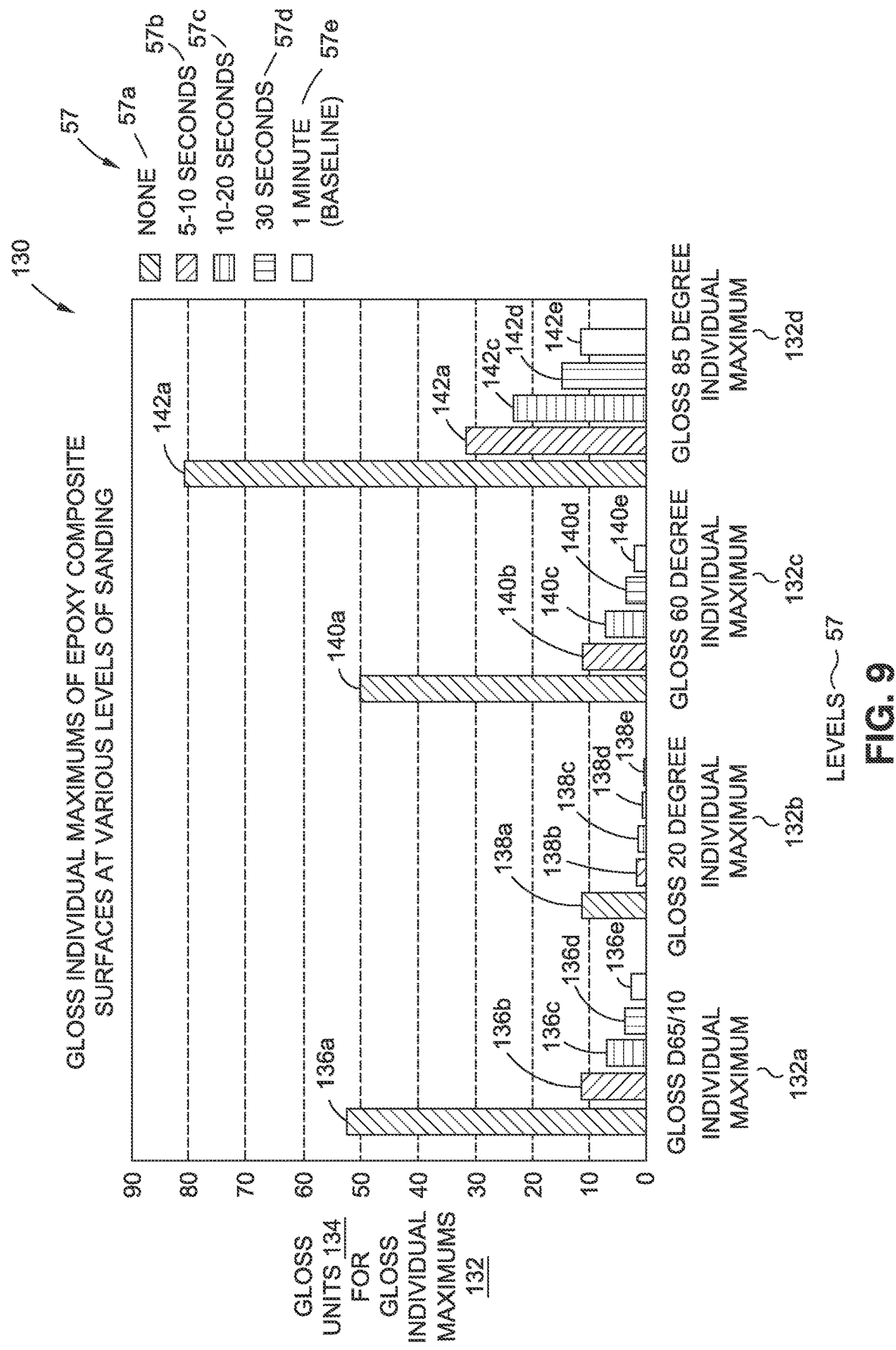
FIG. 9 is an illustration of a graph showing gloss individual maximums of epoxy composite surfaces at various levels of sanding.
Figure 11:
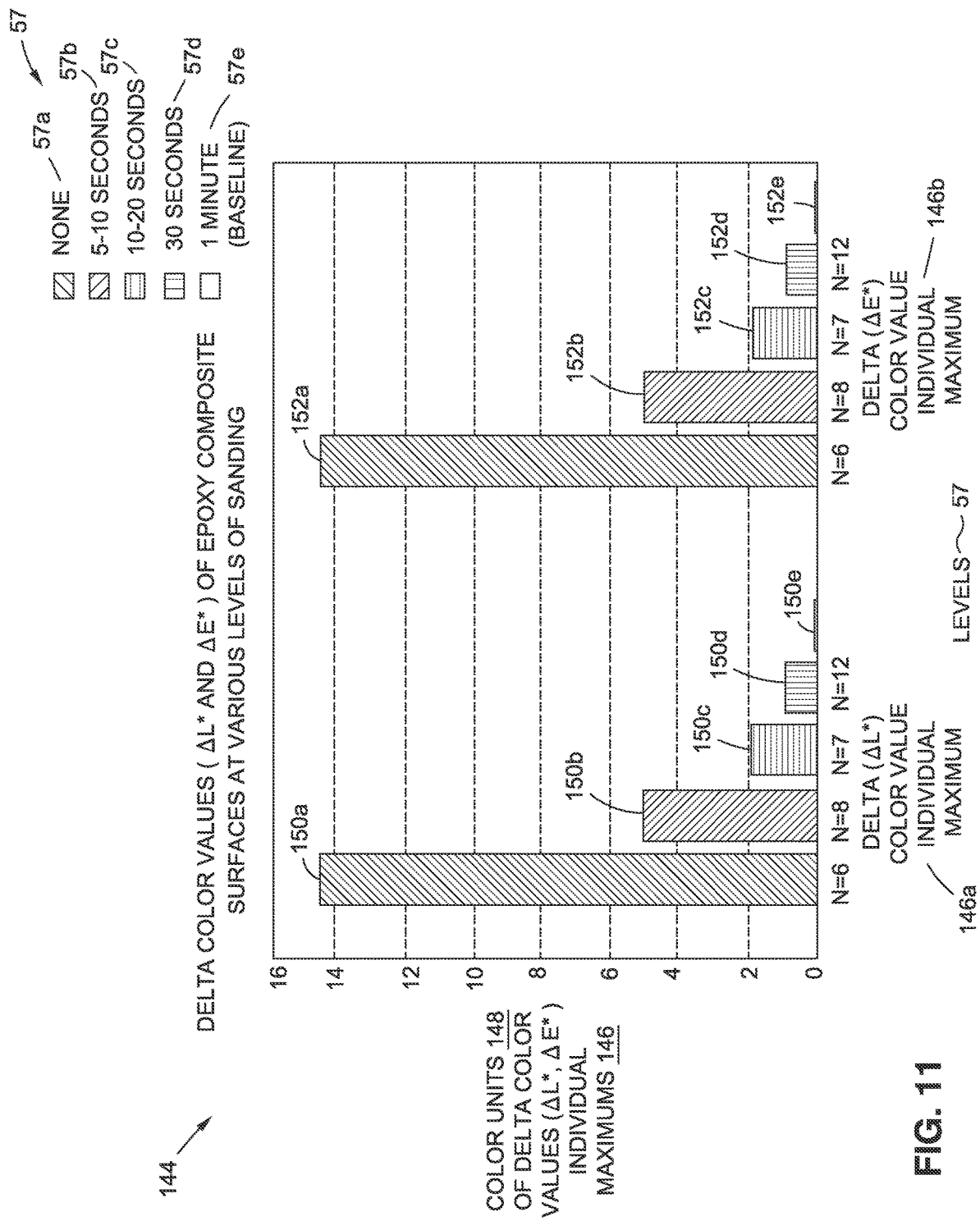
FIG. 11 is an illustration of a graph showing delta color values individual maximums of epoxy composite surfaces at various levels of sanding.
Figure 13:
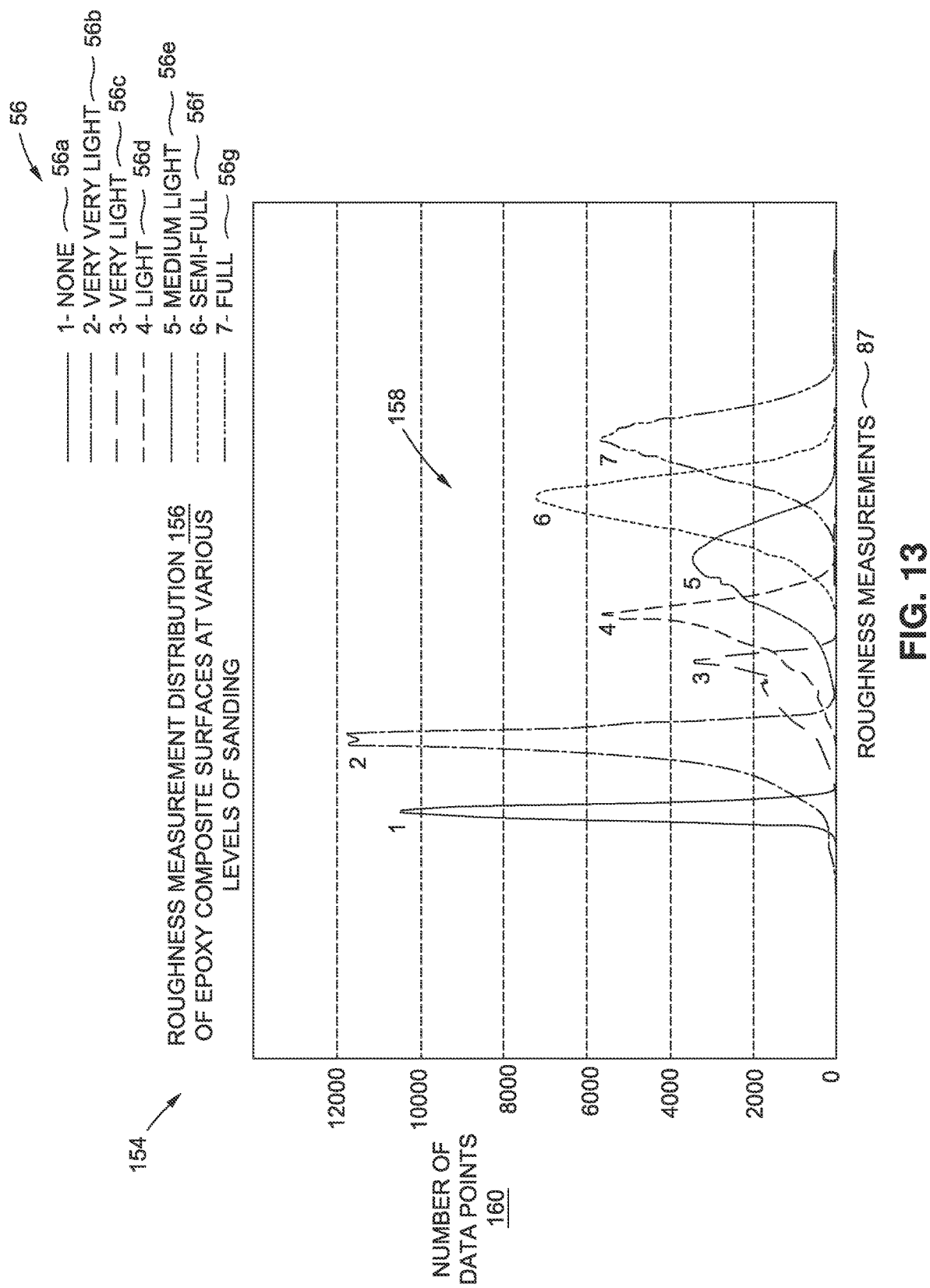
FIG. 13 is an illustration of a graph showing a roughness measurement distribution of epoxy composite surfaces at various levels of sanding.

The system 90 further comprises a plurality of levels 55 (see FIG. 3) of abrasive surface preparation standards 46 (see FIG. 3), such as sanding surface preparation standards 46a (see FIG. 3), fabricated for the reference composite surface 30. For assessment of the surface analysis tools 60 comprising the Fourier transform infrared (FTIR) spectrometer 66 (see FIG. 3), the optically stimulated electron emission (OSEE) sensor 70 (see FIG. 3), and the optical interferometer 86 (see FIG. 3), the plurality of levels 55 preferably comprise levels 56 (see FIG. 3) of the amount of abrading 48 (see FIG. 3), such as sanding 48a (see FIG. 3). As shown in FIGS. 6, 8, and 13, and discussed in further detail below, the levels 56 of the amount of abrading 48, such as sanding 48a, include none (no sanding) 56a, very very light 56b, very light 56c, light 56d, medium light 56e, semi-full 56f, and full 56g, and may also be referred to as a ladder panel of the levels 56. For assessment of the surface analysis tools 60 comprising the gloss meter 74 (see FIG. 3) and the colorimeter 80 (see FIG. 3), the plurality of levels 55 preferably comprise levels 57 (see FIG. 3) of the time of abrading 48 (see FIG. 3), such as sanding 48a (see FIG. 3). As shown in FIGS. 9 and 11, and as discussed in further detail below, the levels 57 of the time of abrading 48, such as sanding 48a, include none (no sanding) 57a, 5-10 seconds 57b, 10-20 second 57c, 30 seconds 57d, and 1 minute (baseline) 57e.

The composite surface 26 of the test composite structure 28a and the reference composite surface 30 of the reference composite structure 32 may both undergo a composite surface treatment 102, such as the abrasive surface preparation 42, for example, sanding surface preparation 42a, using an abrading device 104 (see FIG. 3), such as a random orbital sander (ROS) 104a (see FIG. 3), or another suitable abrading device 104, to obtain an abraded surface 49 (see FIG. 3), such as a sanded surface 49a (see FIG. 3). The composite surface 26 has one or more abrasive surface preparation locations 44, such as sanding surface preparation locations 44a (see FIG. 3), that have undergone abrading 48 (see FIG. 3), such as sanding 48a (see FIG. 3), for example, manual sanding 48b (see FIG. 3), with the abrading device 104, such as the random orbital sander (ROS) 104a, or another suitable abrading device 104.

As shown in FIG. 3, the system 90 further comprises one or more surface analysis tools 60, such as portable surface analysis tools 60a, that are used for a composite surface measurement process check 106 (see FIG. 3). The one or more surface analysis tools 60 are used to create one or more target values 62 (see FIG. 3) for quantifying each of the plurality of levels 55 of the abrasive surface preparation standards 46. The one or more surface analysis tools 60 are configured to measure the one or more abrasive surface preparation locations 44, to obtain one or more measurements 64 (see FIG. 3), such as one or more test result measurements 64a (see FIG. 3).

Each of the one or more measurements 64, such as the one or more test result measurements 64a, is compared to the plurality of levels 55 of the abrasive surface preparation standards 46, to obtain one or more test result levels 58 (see FIG. 3) of the abrasive surface preparation 42 of the composite structure 28, such as the test composite structure 28a, and to determine if the one or more test result levels 58 meet the one or more target values 62, to determine the quality 24 of the abrasive surface preparation 42 of the composite surface 26, and to determine if the composite surface 26 is acceptable to proceed with undergoing the post-processing operation 50.

As shown in FIG. 3, the surface analysis tool 60 may comprise the Fourier transform infrared (FTIR) spectrometer 66, to measure one or more Fourier transform infrared (FTIR) signal measurements 67 of the composite surface 26. As discussed above, the FTIR spectrometer 66 uses the Fourier transform infrared (FTIR) spectroscopy process 68 (see FIG. 3) to obtain the infrared (IR) spectra of absorption or emission of the abrasive surface preparation location(s) 44, such as the sanding surface preparation location(s) 44a, of the composite surface 26 of the test composite structure 28a. The FTIR spectrometer 66 is able to detect the test result level 58 of the abrasive surface preparation 42, such as the sanding surface preparation 42a, including the composite surface treatment 102, of the test composite structure 28a. Preferably, the Fourier transform infrared (FTIR) target value (TV) 62a (see FIG. 3) comprises a peak area under a curve that is less than 7 (seven) for measuring the composite surface 26, such as the epoxy composite surface 26c (see FIG. 3). The FTIR spectroscopy process 68 may further require the post signal processing 69 (see FIG. 3).

As shown in FIG. 3, the surface analysis tool 60 may further comprise the optically stimulated electron emission (OSEE) sensor 70, to measure one or more optically stimulated electron emission (OSEE) signal measurements 72 of the abrasive surface preparation location(s) 44, such as the sanding surface preparation location(s) 44a, of the composite surface 26 of the test composite structure 28a. As discussed above, the OSEE sensor 70 uses ultraviolet (UV) light to create electron emission from the abrasive surface preparation location(s) 44, such as the sanding surface preparation location(s) 44a, of the composite surface 26, resulting in a small current detected by the OSEE sensor 70. Preferably, the optically stimulated electron emission (OSEE) target value (TV) 62b (see FIG. 3) comprises the OSEE signal measurement 72 of about 100 (one hundred) for measuring the composite surface 26, such as the epoxy composite surface 26c (see FIG. 3). The OSEE sensor 70 may require compressed gas 73 (see FIG. 3), such as compressed argon gas 73a (see FIG. 3), to function.

As shown in FIG. 3, the surface analysis tool 60 may further comprise the gloss meter 74, to measure one or more gloss measurements 76 of gloss 77 at one or more gloss illumination angle geometries 78 of the abrasive surface preparation location(s) 44, such as the sanding surface preparation location(s) 44a, of the composite surface 26 of the test composite structure 28a. As further shown in FIG. 3, the gloss illumination angle geometries 78 may comprise the 85 (eighty-five) degree gloss illumination angle geometry 78a, the 60 (sixty) degree gloss illumination angle geometry 78b, the 20 (twenty) degree gloss illumination angle geometry 78c, or another suitable gloss illumination angle geometry 78. Preferably, the gloss meter 74 measures the one or more gloss measurements 76 of gloss 77 at the gloss illumination angle geometry 78 comprising the 85 (eighty-five) degree gloss illumination angle geometry 78a. Preferably, the gloss target value (TV) 62c (see FIG. 3) for the 85 (eighty-five) degree gloss illumination angle geometry 78a is less than 12 (twelve) for measuring the composite surface 26, such as the epoxy composite surface 26c (see FIG. 3).

As shown in FIG. 3, the surface analysis tool 60 may further comprise the colorimeter 80, to measure color 85 (see FIG. 3), such as one or more color values (CV) 82, including one or more delta color values (CV) 84, for example, the delta E* (ΔE*) color value 84a and the delta L*

(ΔL*) color value 84b, of the abrasive surface preparation location(s) 44, such as the sanding surface preparation location(s) 44a, of the composite surface 26 of the test composite structure 28a. Preferably, the color target value (TV) 62d (see FIG. 3) for the delta E* (ΔE*) color value 84a (see FIG. 3) is as close to 0 (zero) as possible for measuring the composite surface 26, such as the epoxy composite surface 26c (see FIG. 3).

As shown in FIG. 3, the surface analysis tool 60 may further comprise the optical interferometer 86, to measure one or more roughness measurements 87 of roughness 88 of the abrasive surface preparation location(s) 44, such as the sanding surface preparation location(s) 44a, of the composite surface 26 of the test composite structure 28a. The roughness 88 is preferably the arithmetical mean roughness (Ra) 88a (see FIG. 3) and the mean roughness depth (Rz) 88b (see FIG. 3). Preferably, the roughness target value (TV) 62e (see FIG. 3) using the optical interferometer 86 comprises a correlation coefficient greater than 98% (ninety-eight percent) for measuring the composite surface 26, such as the epoxy composite surface 26c (see FIG. 3).

Figure 4:
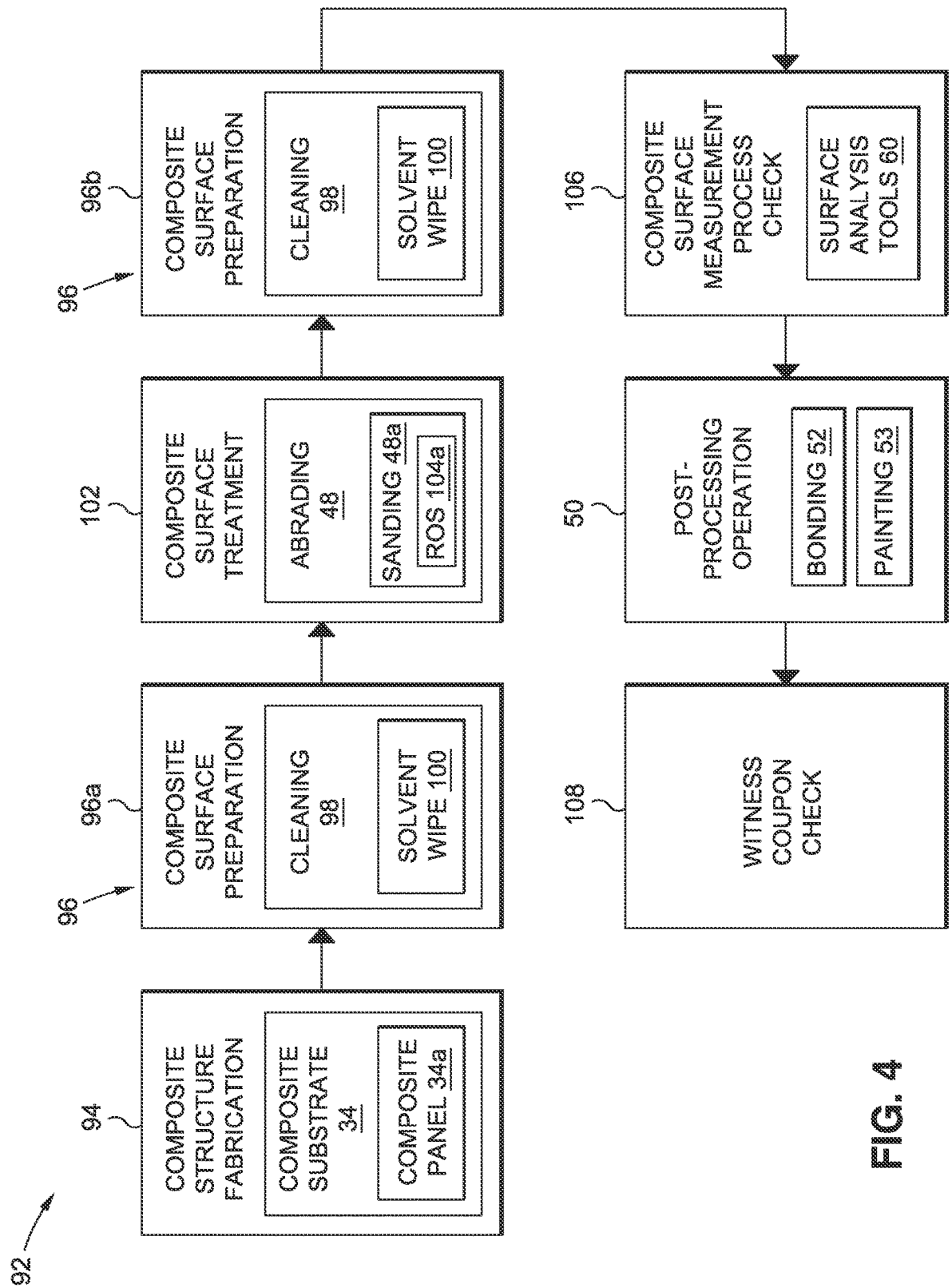
FIG. 4 is an illustration of an exemplary version of an in-line process control check of the disclosure.

Now referring to FIG. 4, FIG. 4 is an illustration of an exemplary version of the in-line process control check 92 (see also FIG. 3) of the disclosure. As shown in FIG. 4, the exemplary in-line process control check 92 comprises the composite structure fabrication 94 of the composite substrate 34, such as in the form of the composite panel 34a, for example, a carbon fiber epoxy composite panel 34b (see FIG. 3). However, the composite substrate 34 may be fabricated with any suitable composite material 36 (see FIG. 3).

As shown in FIG. 4, the exemplary in-line process control check 92 further comprises a composite surface preparation 96, such as a first composite surface preparation 96a, of the composite surface 26 (see FIG. 3) of the composite substrate 34, such as the composite panel 34a. The composite surface preparation 96, such as the first composite surface preparation 96a, may comprise cleaning 98 (see FIG. 4), such as a solvent wipe 100 (see FIG. 4), of the composite surface 26. The cleaning 98 may be performed using a cloth or other suitable cleaning material. The solvent wipe 100 may include wiping with a solvent such as a methyl propyl ketone/methyl isobutyl ketone mixture, or another suitable solvent or solvent mixture.

As shown in FIG. 4, after the composite surface 26 is initially cleaned, the exemplary in-line process control check 92 further comprises the composite surface treatment 102 of the composite surface 26 (see FIG. 3) of the composite substrate 34, such as the composite panel 34a. The composite surface treatment 102 preferably comprises abrading 48 (see FIG. 4), such as sanding 48a (see FIG. 4), with an abrading device 104 (see FIG. 3), such as a random orbital sander (ROS) 104a (see FIG. 4). Preferably, manual sanding 48b (see FIG. 3) of the composite surface 26 is performed. Several parameters may control the level 55 (see FIG. 3) of abrading 48, such as sanding 48a, including pressure, disk speed (revolutions per minute (RPM)), number of passes, and overall time of abrading 48, such as sanding 48a. The abrading device 104, such as the random orbital sander (ROS) 104a may use 180 grit aluminum oxide sand paper disks, or another suitable type of sanding material.

As shown in FIG. 4, after the composite surface 26 undergoes the composite surface treatment 102, the exemplary in-line process control check 92 may further optionally comprise another composite surface preparation 96, such as a second composite surface preparation 96b, as needed, of the composite surface 26 (see FIG. 3), that has been abraded or sanded. The composite surface preparation 96, such as the second composite surface preparation 96b, may comprise cleaning 98 (see FIG. 4), such as the solvent wipe 100 (see FIG. 4), of the composite surface 26 that has been abraded or sanded. As discussed above, the cleaning 98 may be performed using a cloth or other suitable cleaning material. The solvent wipe 100 may include wiping with a solvent such as a methyl propyl ketone/methyl isobutyl ketone mixture, or another suitable solvent or solvent mixture.

As shown in FIG. 4, after the composite surface 26, that has been abraded or sanded, optionally undergoes the composite surface preparation 96, such as the second composite surface preparation 96b, the exemplary in-line process control check 92 further comprises composite surface measurement process check 106 using the one or more surface analysis tools 60. As discussed above, the one or more surface analysis tools 60 may include the FTIR spectrometer 66 (see FIG. 3), the OSEE sensor 70 (see FIG. 3), the gloss meter 74 (see FIG. 3), the colorimeter 80 (see FIG. 3), and the optical interferometer 86 (see FIG. 3). The one or more surface analysis tools 60 are used to take measurements 64 (see FIG. 3), such as test result measurements 64a (see FIG. 3), of one or more abrasive surface preparation locations 44 (see FIG. 3), such as one or more sanding surface preparation locations 44a (see FIG. 3), of the composite surface 26 (see FIG. 3) of the test composite structure 28a (see FIG. 3).

As shown in FIG. 4, after the composite surface 26, that has been abraded or sanded, undergoes the composite surface measurement process check 106 using the one or more surface analysis tools 60, the exemplary in-line process control check 92 further comprises the post-processing operation 50, such as bonding 52, painting 53, or another suitable post-processing operation 50, if it is determined that the composite surface 26 of the test composite structure 28a is acceptable to proceed with undergoing the post-processing operation 50. For example, the composite surface 26, if acceptable for bonding 52, may be bonded to a structure 40 (see FIG. 3), such as an aircraft structure 40a (see FIG. 3).

As shown in FIG. 4, after the composite surface 26, that has been acceptably abraded or sanded, undergoes the post-processing operation 50, the exemplary in-line process control check 92 further comprises a witness coupon check 108 of the composite surface 26 of the test composite structure 28a bonded to the structure 40 (see FIG. 3), such as the aircraft structure 40a (see FIG. 3), to verify that the bonded joint is acceptable and meets certification requirements.

EXAMPLE

Each of the surface analysis tools 60, including the FTIR spectrometer 66 (see FIGS. 3, 6), the OSEE sensor 70 (see FIGS. 3, 8), the gloss meter 74 (see FIGS. 3, 10), the colorimeter 80 (see FIGS. 3, 12), and the optical interferometer 86 (see FIGS. 3, 14), were evaluated for their ability to quantitatively measure and assess the presence and level of abrasive surface preparation 42 (see FIG. 3), such as sanding surface preparation 42a (see FIG. 3). The surface analysis tools 60 were selected based on their potential to detect variations in the abrasive surface preparation output, the tool's rapid measurement capabilities, and the ability of their output to be used as a "go/no go" check in a real time process control system 90c (see FIG. 3). The goal was for each surface analysis tool 60 to be utilized as an in-line process control check tool to verify if a bonding process step had occurred, and if it had been performed correctly.

In addition to analytical measurement, process parameters such as sanding time, pressure, and equipment settings were also evaluated. Both the surface analysis tool results and the process parameter variables were intended to be integrated into the process control system 90a (see FIG. 3) discussed above, or an enhanced bonding workstation discussed below. A more tightly controlled process control system 90a narrows the limits in which an operation may take place and improves the reliability of the bonding process, resulting in a more robust bonded joint. An additional benefit of the in-line process control check 92 (see FIGS. 3, 4) having video monitoring is a digital thread enabling downstream troubleshooting should an issue arise in the field on a specific bonded part.

Composite Structure Fabrication

Composite structures 28 (see FIG. 3), such as composite substrates 34 (see FIGS. 3, 4), in the form of composite panels 34a (see FIGS. 3, 4), were made of carbon fiber epoxy composite fabric. The composite panels were fabricated using 10 (ten) plies of 177° C. (350° F.) cure carbon fiber epoxy prepreg. The 8 (eight) inner plies were unidirectional tape and the 2 (two) outer plies were fabric. The composite panels were cured against a tool treated with FREKOTE 710-NC mold release agent (FREKOTE is a registered trademark owned by Henkel IP & Holding GMBH LLC of Germany.)

Composite Surface Preparation

The composite surface of each composite panel was solvent wiped prior to, and after, sanding, with an EASTMAN methyl isobutyl ketone (MIBK)/methyl propyl ketone (MPK) solvent mixture. (EASTMAN is a registered trademark owned by Eastman Chemical Company of Kingsport, Tenn.) The composite panels were solvent wiped using cleaning cloths, meeting the requirements of SAE (Society of Automotive Engineers) International AMS3819C, Class 2, Grade A, "Cloths, Cleaning, for Aircraft Primary and Secondary Structural Surfaces".

Composite Surface Treatment

Each composite panel was surface treated by using varied process parameters associated with manually sanding with a random orbital sander (ROS) 104a and 180 grit aluminum oxide sand paper disks. Time was used as a processing variable. For assessment of the surface analysis tools 60, including the FTIR spectrometer 66, the OSEE sensor 70, and the optical interferometer 86, a ladder panel with various levels of sanding was used, including the levels 56 (see FIG. 3) of the amount of sanding of: none (no sanding) 56a, very very light 56b, very light 56c, light 56d, medium light 56e, semi-full 56f, and full 56g (see FIGS. 5A-5B, 7, and 13). For assessment of surface analysis tools 60, including the gloss meter 74 and the colorimeter 80, an array of composite panels were utilized that had levels 57 (see FIG. 3) of sanding correlating to: none (no sanding) 57a, 5-10 seconds 57b, 10-20 second 57c, 30 seconds 57d, and 1 minute (baseline) 57e (see FIGS. 9, 11). Sanding for 1 (one) minute was the control process baseline.

Composite Surface Analysis

Pre-bond composite surfaces were characterized before and after composite surface treatment. The composite surfaces of the composite panels were measured using Fourier transform infrared (FTIR) signal measurements 67 (see FIGS. 3, 5A-5B, 6), optically stimulated electron emission (OSEE) signal measurements 72 (see FIGS. 3, 7, 8), gloss measurements 76 (see FIGS. 3, 9, 10), color values 82 (see FIGS. 3, 11, 12), and roughness measurements 87 (see FIGS. 3, 13, 14). A KEYENCE VHX-2000 (Version 2.3.5.1) multi-scan digital microscope was used to image each composite surface. (KEYENCE is a registered trademark owned by Keyence Corporation of Osaka, Japan.) A polarizer and glare reduction setting was used to accentuate surface morphology. Digital microscope images of the unsanded and sanded surfaces were collected at 20× and 200×. Scratches were observed even on the non-sanded surface, indicating that they were likely from solvent wiping or composite panel handling. A depth analysis of the 1 (one) minute sanded baseline composite panel confirmed that the sanding surface preparation step generated a smoothed out surface with no detectable troughs or valleys.

FTIR

Figure 5A:
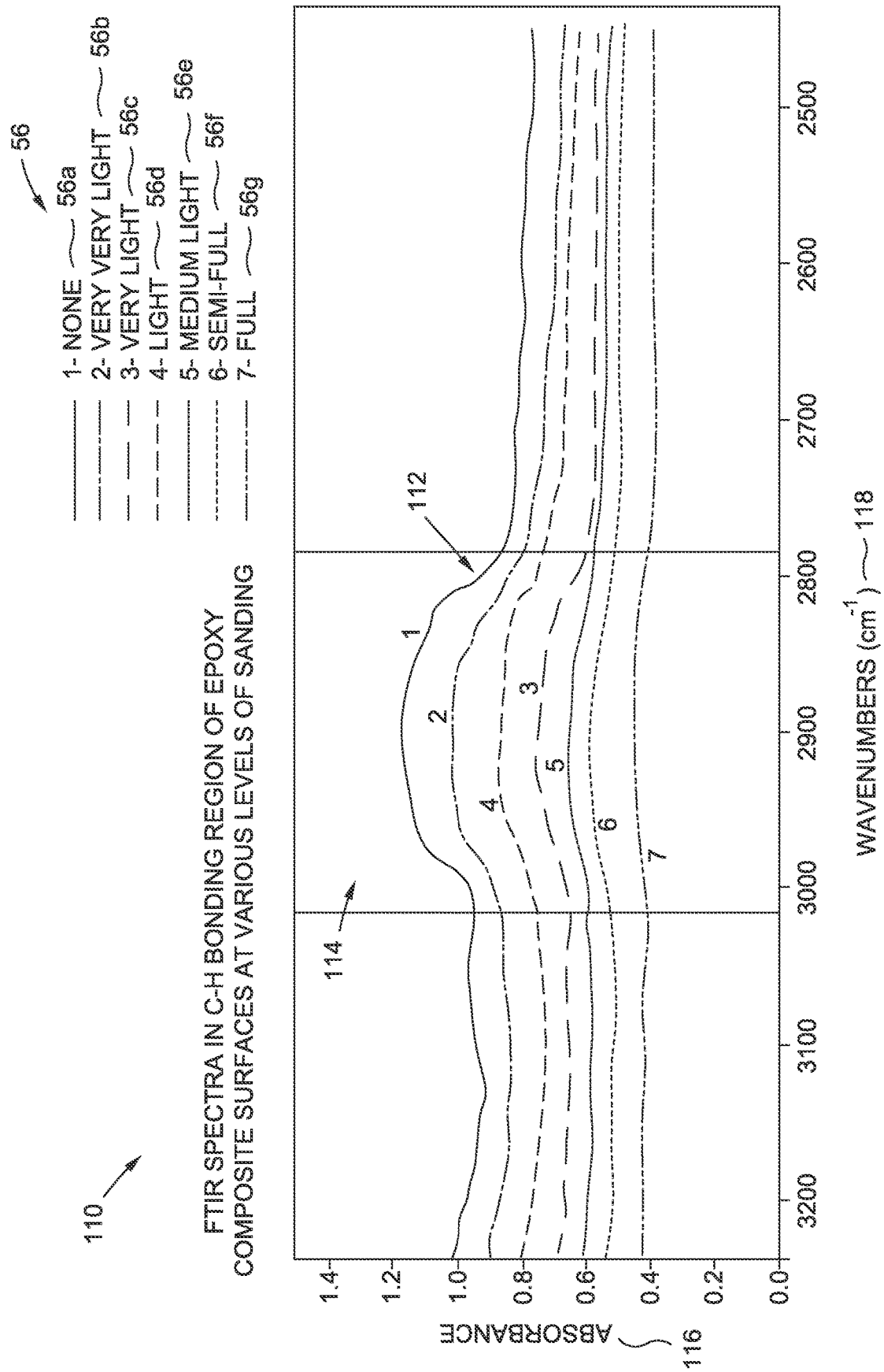
FIG. 5A is an illustration of a graph showing Fourier transform infrared (FTIR) spectra plots in a C—H bonding region of epoxy composite surfaces at various levels of sanding.
Figure 5B:
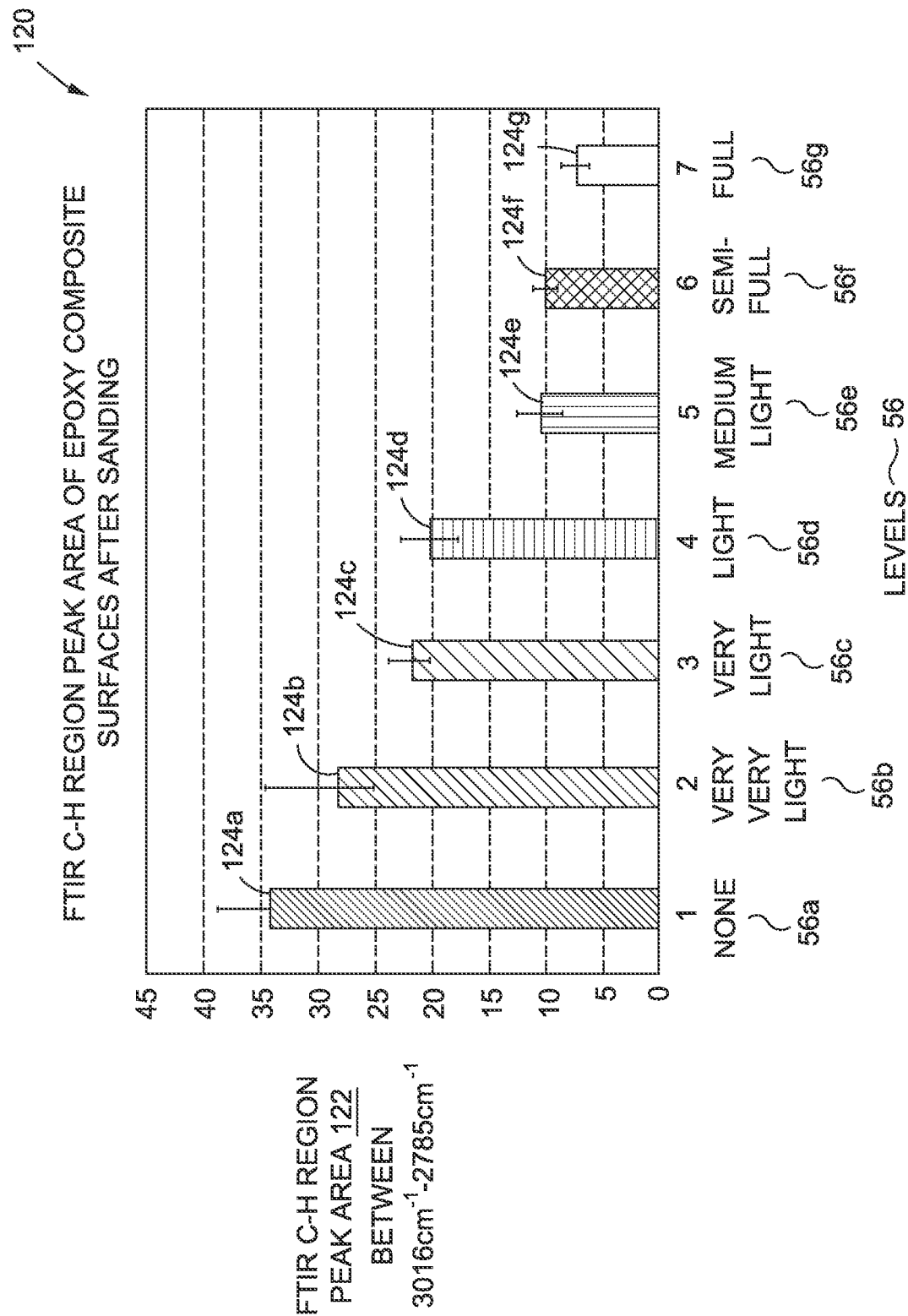
FIG. 5B is an illustration of a graph showing a Fourier transform infrared (FTIR) C—H region peak area of epoxy composite surfaces after sanding.

Fourier transform infrared (FTIR) signal measurements, including chemical information measurements, were gathered using FTIR spectroscopy, with an AGILENT Model 4100 ExoScan spectrometer, gain of 243, 64 scan, 8 cm$^{-1}$ wavenumber resolution between 650 and 4000 wavenumbers and a diffuse reflectance attachment. (AGILENT is a registered trademark owned by Agilent Technologies, Inc. of Santa Clara, Calif.) FIGS. 5A, 5B, and 6 relate to the FTIR analysis.

Now referring to FIG. 5A, FIG. 5A is an illustration of a graph 110 showing Fourier transform infrared (FTIR) spectra plots 112 of a C—H bonding region 114 of epoxy composite surfaces 26c (see FIG. 3) at various levels 56 of an amount of sanding 48a (see FIG. 3), based on FTIR signal measurements 67 (see FIG. 3) taken with the FTIR spectrometer 66 (see FIGS. 3, 6). As shown in FIG. 5A, the graph 110 shows absorbance 116 on the y-axis, and shows wavenumbers (cm$^{-1}$) 118 on the x-axis. Peak area analysis was performed in the C—H bonding region 114, shown as the region between 3016 cm$^{-1}$ to 2785 cm$^{-1}$, representing the C (carbon)-H (hydrogen) bonding region 114 of the epoxy polymer of the epoxy composite surface 26c of the composite structure 28 (see FIG. 3), such as the test composite structure 28a (see FIG. 3). As shown in FIG. 5A, the levels 56 of the amount of sanding 48a (see FIG. 3) include: 1—NONE (no sanding) 56a, 2—VERY VERY LIGHT 56b, 3—VERY LIGHT 56c, 4—LIGHT 56d, 5—MEDIUM LIGHT 56e, 6—SEMI-FULL 56f, and 7—FULL 56g. FIG. 5A further shows the FTIR spectra plots 112 numbered 1-7. A decrease in the overall FTIR signal measurements 67 (see FIG. 3) was observed with increased sanding, potentially due to the reduction in the amount of organic epoxy resin on the surface, with increased sanding time.

Now referring to FIG. 5B, FIG. 5B is an illustration of a graph 120 showing a Fourier transform infrared (FTIR) C—H region peak area 122 of epoxy composite surfaces 26c (see FIG. 3) after sanding 48a (see FIG. 3). As shown in FIG. 5B, the graph 120 shows the FTIR C—H region peak area 122 between 3016 cm$^{-1}$ to 2785 cm$^{-1}$ on the y-axis, and shows the levels 56 of the amount of sanding 48a on the x-axis. The epoxy composite surfaces 26c were sanded at the various levels 56 with a random orbital sander (ROS) 104a (see FIG. 4) having a 180 grit aluminum oxide sand paper. FIG. 5B shows plots 124a-124g of the FTIR C—H region peak area 122 versus level 56 of the amount of sanding 48a. The results, as shown by the graph 120 (see FIG. 5B), indicated a decrease in FTIR C—H region peak area 122 versus level 56 of the amount of sanding 48a. There was a high standard deviation and near overlap of the error bars in the lower sanded region. The results, as shown by the graph 120, showed that there was potential for usage of FTIR for in-line process control to indicate sanded or unsanded surfaces, and that FTIR was able to successfully detect the level of abrasive surface preparation 42 (see FIG. 3), such as sanding surface preparation 42a (see FIG. 3). Setting a target value 62 (see FIG. 3), such as an FTIR target value 62*a* (see FIG. 3), or threshold limit, for the amount of sanding and establishing whether the FTIR C—H region peak area 122 selected had enough differentiation from the baseline values was recommended. The results showed that using the FTIR spectroscopy process 68 (see FIG. 3) and the FTIR spectrometer 66 (see FIG. 6) detected whether the epoxy composite surface 26*c* was sanded or unsanded, and also detected the level of the sanding or sanding surface preparation. Although the the FTIR C—H region peak area 122 shown in FIG. 5B is between 3016 cm$^{-1}$ to 2785 cm$^{-1}$, another suitable range may also be used. Preferably, the FTIR C—H region peak area 122 is in a range between 3200 cm$^{-1}$ to 2500 cm$^{-1}$. More preferably, the FTIR C—H region peak area 122 is in a range between 3100 cm$^{-1}$ to 2600 cm$^{-1}$. Most preferably, the FTIR C—H region peak area 122 is in a range between 3016 cm$^{-1}$ to 2785 cm$^{-1}$.

Now referring to FIG. 6, FIG. 6 is an illustration of a perspective side view of a surface analysis tool 60, such as in the form of a Fourier transform infrared (FTIR) spectrometer 66, in use by a user 125 taking Fourier transform infrared (FTIR) signal measurements 67 (see FIG. 3) of an abraded surface 49, such as a sanded surface 49*a*, after abrading 48 (see FIG. 3), such as sanding 48*a* (see FIG. 3), at various levels 56. As shown in FIG. 6, the FTIR spectrometer 66 detects FTIR signal measurements 67 at the levels 56 of the amount of abrading 48, such as sanding 48*a*, of none (no sanding) 56*a*, very very light 56*b*, very light 56*c*, light 56*d*, medium light 56*e*, semi-full 56*f*, and full 56*g*, of the composite surface 26, such as the test composite surface 26*a*, of the composite structure 28, such as the test composite structure 28*a*. As further shown in FIG. 6, the surface analysis tool 60, such as in the form of the FTIR spectrometer 66, is a portable surface analysis tool 60*a* that may be hand-held and manually used to take the FTIR signal measurements 67.

OSEE

Figure 7:
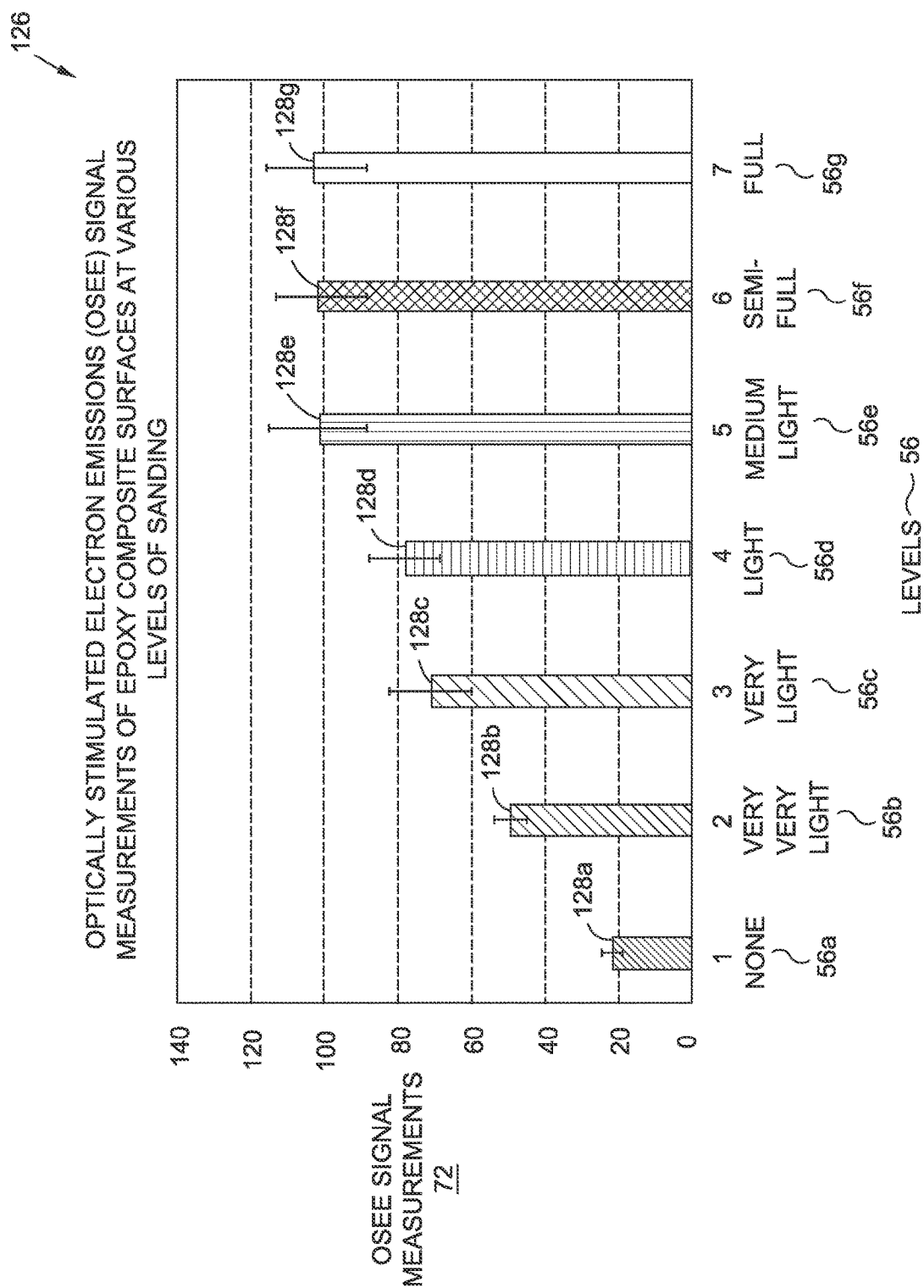
FIG. 7 is an illustration of a graph showing optically stimulated electron emission (OSEE) signal measurements of epoxy composite surfaces at various levels of sanding.

Optically stimulated electron emission (OSEE) measurements were gathered using the optically stimulated electron emission (OSEE) sensor developed by NASA (National Aeronautics and Space Administration), as disclosed in U.S. Pat. No. 5,393,980. The OSEE measurements were taken using an ultraviolet (UV) lamp set point of 3041, grid offset of −41 m, and peak-to-peak amplitude of 3.7. FIGS. 7 and 8 relate to the OSEE analysis.

Now referring to FIG. 7, FIG. 7 is an illustration of a graph 126 showing optically stimulated electron emission (OSEE) signal measurements 72 of epoxy composite surfaces 26*c* (see FIG. 3) at various levels 56 of the amount of sanding 48*a* (see FIG. 3), based on OSEE signal measurements 72 taken with an OSEE sensor 70 (see FIGS. 3, 8). As shown in FIG. 7, the graph 126 shows the OSEE signal measurements 72 on the y-axis, and shows the levels 56 of the amount of sanding 48*a* on the x-axis. The epoxy composite surfaces 26*c* were sanded at the various levels 56 with a random orbital sander (ROS) 104*a* (see FIG. 4) having a 180 grit aluminum oxide sand paper. FIG. 7 shows plots 128*a*-128*g* of the OSEE signal measurements 72 versus the levels 56 of the amount of sanding 48*a*.

The OSEE signal measurements 72 reached a leveling off point, which may need to be considered when using the OSEE sensor 70 on composite substrates made of composite materials different than epoxy composite materials. The use of the OSEE sensor 70 also required compressed gas 73 (see FIG. 3), such as compressed argon gas 73*a* (see FIG. 3), to function, and there may be some sensitivity of the OSEE sensor 70 or detector to frayed or exposed carbon fibers. However, the results, as shown by the graph 126, showed that OSEE was able to successfully detect the level of abrasive surface preparation 42 (see FIG. 3), such as sanding surface preparation 42*a* (see FIG. 3), with good sensitivity, and showed that OSEE was able to successfully measure the presence and level of sanding 48*a* in a rapid "go/no go" manner. The results showed that using the OSEE sensor 70 (see FIG. 8) detected whether the composite surface was sanded or unsanded, and also detected the level of the sanding or sanding surface preparation.

Now referring to FIG. 8, FIG. 8 is an illustration of a perspective side view of a surface analysis tool 60, such as in the form of an optically stimulated electron emission (OSEE) sensor 70, in use by a user 125 taking optically stimulated electron emission (OSEE) signal measurements 72 of an abraded surface 49, such as a sanded surface 49*a*, after abrading 48 (see FIG. 3), such as sanding 48*a* (see FIG. 3), at various levels 56. As shown in FIG. 8, the OSEE sensor 70 detects OSEE signal measurements 72 at the levels 56 of the amount of abrading 48, such as sanding 48*a*, of none (no sanding) 56*a*, very very light 56*b*, very light 56*c*, light 56*d*, medium light 56*e*, semi-full 56*f*, and full 56*g*, of the composite surface 26, such as the test composite surface 26*a*, of the composite structure 28, such as the test composite structure 28*a*. As further shown in FIG. 8, the surface analysis tool 60, such as in the form of the OSEE sensor 70, is a portable surface analysis tool 60*a* that may be hand-held and manually used to take the OSEE signal measurements 72.

Gloss

Figure 10:
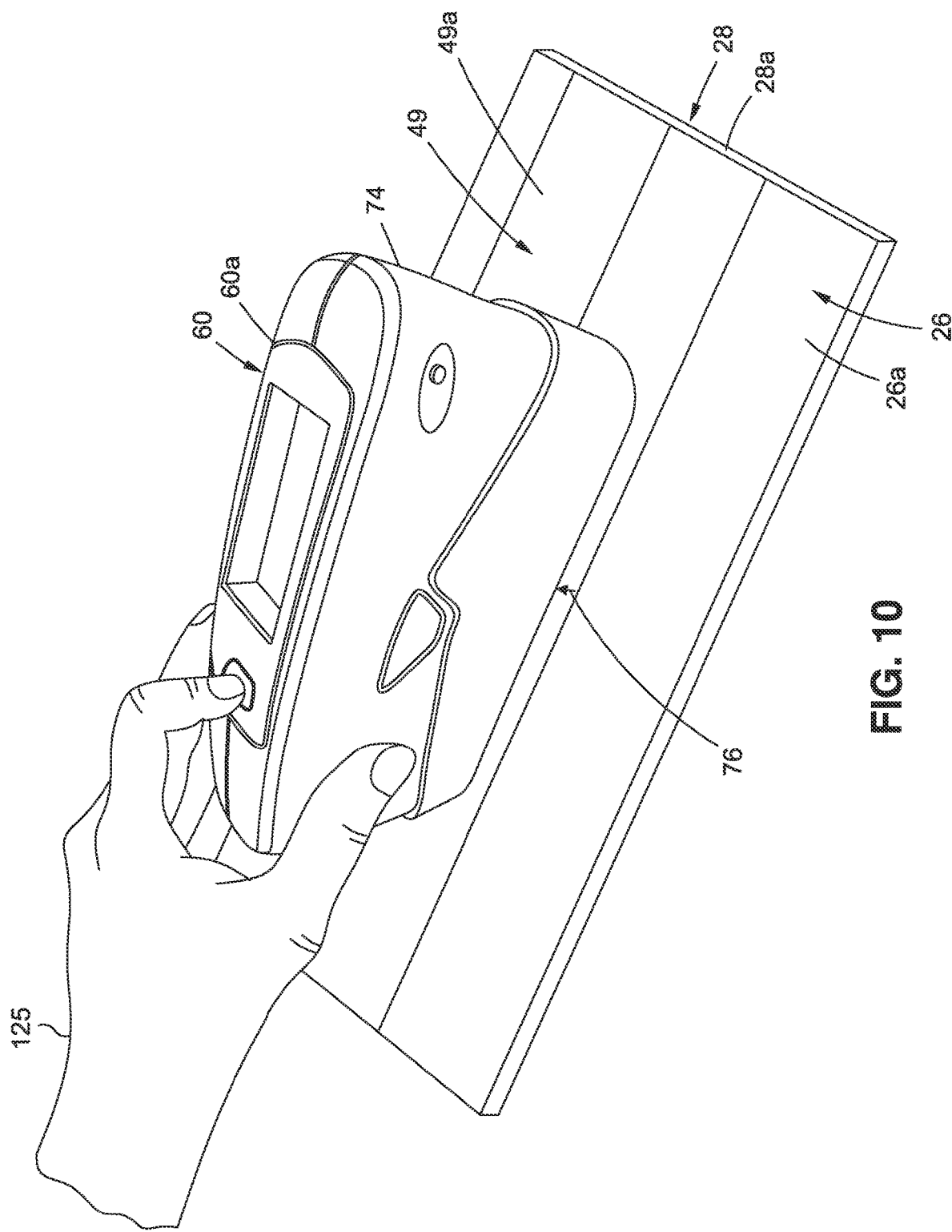
FIG. 10 is an illustration of a perspective side view of a gloss meter in use by a user taking gloss measurements of an abraded surface of a composite structure.

Gloss measurements for all but the gloss D65/10 were collected using a BYK GARDNER Micro-Tri-Gloss Model 4435 gloss meter. Gloss measurements for gloss D65/10 were collected using a BYK GARDNER Spectro-Guide 45/0 gloss Model CC-6801 color meter, separate from the gloss meter. (BYK GARDNER is a registered trademark owned by BYK Gardner GmbH of Germany.) For gloss D65/10, D65 is an illuminant which represents standard daylight, and 10 refers to a gloss aperture which is 5×10 mm (gloss value reported by the color meter had an illumination angle geometry of 60 degrees). FIGS. 9 and 10 relate to the gloss analysis.

Now referring to FIG. 9, FIG. 9 is an illustration of a graph 130 showing gloss individual maximums 132 of epoxy composite surfaces 26*c* (see FIG. 3) at various levels 57 of a time of sanding 48*a* (see FIG. 3), based on gloss measurements 76 (see FIG. 3) taken with a gloss meter 74 (see FIGS. 3, 10). Gloss 77 (see FIG. 3) was investigated to quantitatively assess a level 57 (see FIG. 9) of the time of sanding 48*a* (see FIG. 3), which was detected visually. As shown in FIG. 9, the graph 130 shows gloss units 134 of the gloss individual maximums 132 on the y-axis, and shows various levels 57 of the time of sanding 48*a* for a gloss D65/10 individual maximum 132*a*, a gloss 20 (twenty) degree individual maximum 132*b*, a gloss 60 (sixty) degree individual maximum 132*c*, and a gloss 85 (eighty-five) degree individual maximum 132*d*, on the x-axis. The epoxy composite surfaces 26*c* were sanded at the various levels 57 with a random orbital sander (ROS) 104*a* (see FIG. 4) having a 180 grit aluminum oxide sand paper. Gloss measurements 76 (see FIG. 3) in gloss units 134 (see FIG. 9) of sanded surfaces 49*a* (see FIG. 3), were collected at gloss individual maximums 132 of D65/10, 20 degrees (20 degree gloss illumination angle geometry 78*c* (see FIG. 3)), 60 degrees (60 degree gloss illumination angle geometry 78*b* (see FIG. 3)), and 85 degrees (85 degree gloss illumination angle geometry 78*a* (see FIG. 3)).

As shown in FIG. 9, the levels 57 of the time of sanding 48a (see FIG. 3) include: NONE (no sanding) 57a, 5-10 SECONDS 57b, 10-20 SECONDS 57c, 30 SECONDS 57d, and 1 MINUTE (BASELINE) 57e. FIG. 9 shows plots 136a-136e for the gloss D65/10 individual maximum 132a at the various levels 57. FIG. 9 shows plots 138a-138e for the gloss 20 (twenty) degree individual maximum 132b at the various levels 57. FIG. 9 shows plots 140a-140e for the gloss 60 (sixty) degree individual maximum 132c at the various levels 57. FIG. 9 shows plots 142a-142e for the gloss 85 (eighty-five) degree individual maximum 132d at the various levels 57.

The results, as shown by the graph 130, showed that the gloss measurements 76 (see FIG. 3) detected whether the composite surface 26 (see FIG. 3) was sanded or unsanded. The gloss 85 (eighty-five) degree individual maximum 132d showed correlation to the levels 57 of the time of sanding 48a. Gloss at 85 (eighty-five) degrees was the recommended geometry for low gloss, matte surfaces. Minimal post signal processing 69 (see FIG. 3) was required. The results showed that using the gloss meter 74 (see FIG. 10) at the 85 (eighty-five) degree gloss illumination angle geometry 78a (see FIG. 3) detected whether the composite surface was sanded or unsanded, and also detected the level of the sanding or sanding surface preparation.

Now referring to FIG. 10, FIG. 10 is an illustration of a perspective side view of a surface analysis tool 60, such as in the form of a gloss meter 74, in use by a user 125 taking a gloss measurement 76 of an abraded surface 49, such as a sanded surface 49a, after abrading 48 (see FIG. 3), such as sanding 48a (see FIG. 3), of the composite surface 26, such as the test composite surface 26a, of the composite structure 28, such as the test composite structure 28a. As shown in FIG. 10, the surface analysis tool 60, such as in the form of the gloss meter 74, is a portable surface analysis tool 60a that may be hand-held and manually used to take the gloss measurements 76.

Color

Figure 12:
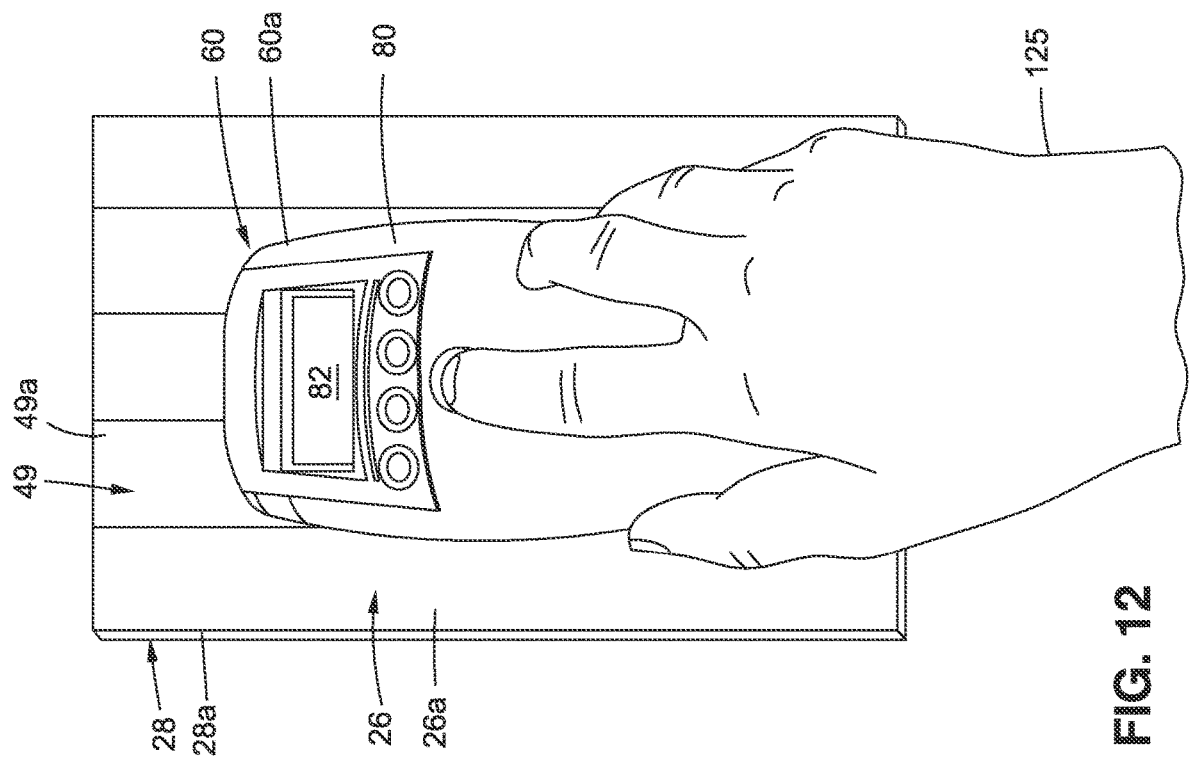
FIG. 12 is an illustration of a perspective top view of a colorimeter in use by a user measuring color values of an abraded surface of a composite structure.

Color values were taken using a BYK GARDNER spectro-guide 45/0 gloss Model CC-6801 using a Commission Internationale de l'Elcairage (CIE) Lab color scale. (BYK GARDNER is a registered trademark owned by BYK Gardner GmbH of Germany.) FIGS. 11 and 12 relate to the color analysis.

Now referring to FIG. 11, FIG. 11 is an illustration of a graph 144 showing delta color values individual maximums 146 of epoxy composite surfaces 26c (see FIG. 3), after sanding 48a (see FIG. 3), at various levels 57 of the time of sanding 48a, based on delta color values 84 (see FIG. 3) measured with a colorimeter 80 (see FIGS. 3, 12). Sanded and unsanded surfaces were distinguished from one another using L* values. L* value is measurement of "Luminance" (lightness) in a CIE color scheme (a and b are color scales). Direct color measurement did not detect the level of sanding. When a delta E* (ΔE*) color value 84a (see FIG. 3) and a delta L* (ΔL*) color value 84b (see FIG. 3) were calculated, as a difference from the baseline control, and the delta L* (ΔL*) color value individual maximum 146a (see FIG. 11) and the delta E* (ΔE*) color value individual maximum 146b were collected, there was a correlation to levels 57 (see FIG. 11) of sanding.

As shown in FIG. 11, the graph 144 shows color units 148 of the delta color values (ΔL*, ΔE*) individual maximums 146 on the y-axis, and shows various levels 57 of the time of sanding 48a for a delta L* (ΔL*) color value individual maximum 146a, and for a delta E* (ΔE*) color value individual maximum 146b. The epoxy composite surfaces 26c were sanded at the various levels 57 with a random orbital sander (ROS) 104a (see FIG. 4) having a 180 grit aluminum oxide sand paper. As shown in FIG. 10, the levels 57 of the time of sanding 48a (see FIG. 3) include: NONE (no sanding) 57a, 5-10 SECONDS 57b, 10-20 SECONDS 57c, 30 SECONDS 57d, and 1 MINUTE (BASELINE) 57e. FIG. 10 shows plots 150a-150e for the delta L* (ΔL*) color value individual maximum 146a at the various levels 57. FIG. 10 shows plots 152a-152e for the delta E* (ΔE*) color value individual maximum 146b at the various levels 57.

The results, as shown by the graph 144, showed that both the delta L* (ΔL*) color value individual maximum 146a and the delta E* (ΔE*) color value individual maximum 146b were good candidates to be used as a quality control tool for the in-line process control check 92 (see FIG. 3), or monitoring, with the system 90 (see FIG. 3), such as the process control system 90a (see FIG. 3), for example, the bond process control system 90b (see FIG. 3). Minimal post signal processing 69 (see FIG. 3) was required. The results showed that using the colorimeter 80 and the delta E* (ΔE*) color value individual maximum 146b detected whether the composite surface was sanded or unsanded, and also detected the level of the sanding or sanding surface preparation.

Now referring to FIG. 12, FIG. 12 is an illustration of a perspective top view of a surface analysis tool 60, such as in the form of a colorimeter 80, in use by a user 125 measuring color values 82 of an abraded surface 49, such as a sanded surface 49a, after abrading 48 (see FIG. 3), such as sanding 48a (see FIG. 3), of the composite surface 26, such as the test composite surface 26a, of the composite structure 28, such as the test composite structure 28a. As shown in FIG. 12, the surface analysis tool 60, such as in the form of the colorimeter 80, is a portable surface analysis tool 60a that may be hand-held and manually used to measure the color values 82.

Roughness

Figure 14:
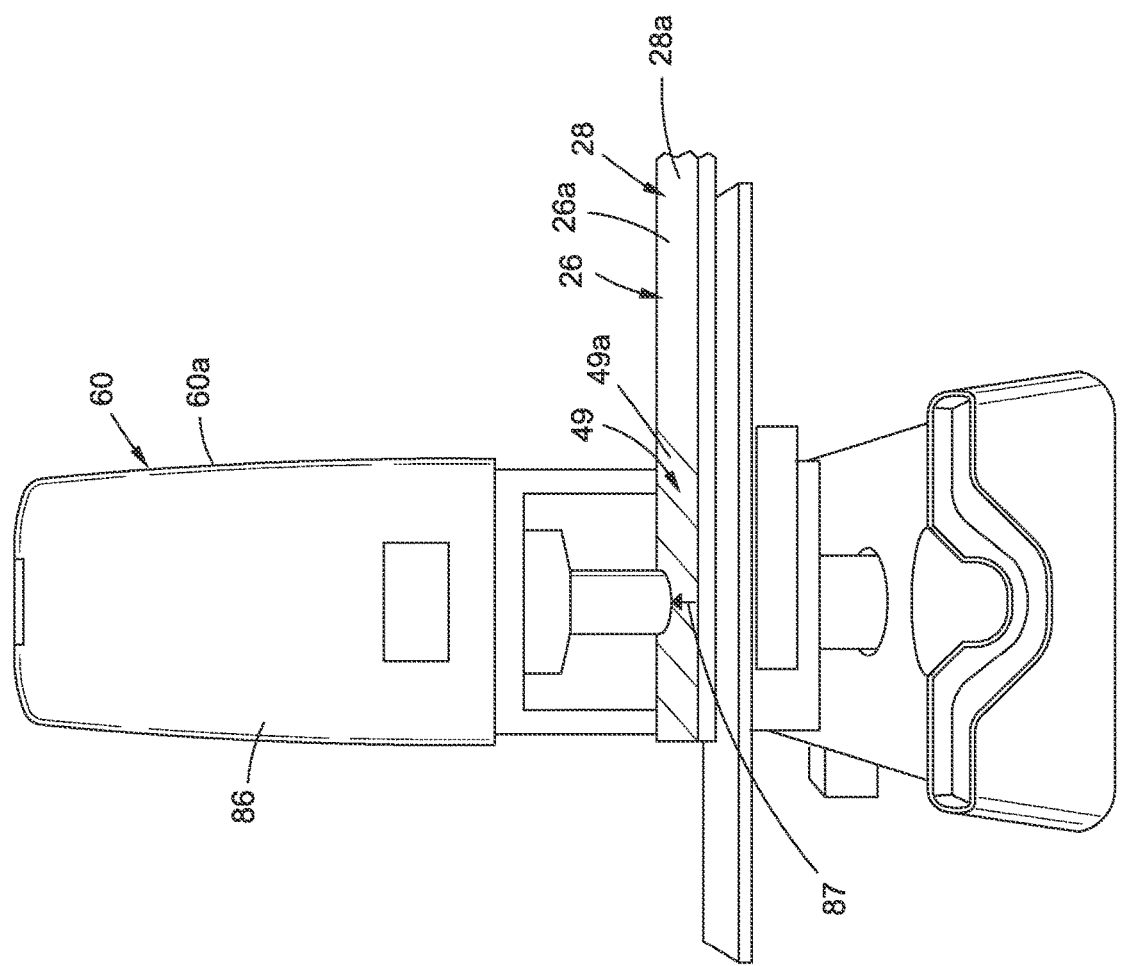
FIG. 14 is an illustration of a perspective front view of an optical interferometer in operation to take roughness measurements of an abraded surface of a composite structure.

Roughness (Ra and Rz) measurements were taken using an optical interferometer with white visible light. The optical interferometer used was a WYKO NT2000 (Veeco) Surface Profiler (WYKO is a registered trademark owned by Bruker Nano, Inc. of Santa Barbara, Calif.) FIGS. 13 and 14 relate to the roughness analysis.

Now referring to FIG. 13, FIG. 13 is an illustration of a graph 154 showing a roughness measurement distribution 156 of roughness measurement plots 158 of epoxy composite surfaces 26c (see FIG. 3) at various levels 56 of the amount of sanding 48a (see FIG. 3), based on roughness measurements 87 measured with an optical interferometer 86 (see FIGS. 3, 14). As shown in FIG. 13, the graph 154 shows number of data points 160 on the y-axis, and shows roughness measurements 87 on the x-axis. As further shown in FIG. 13, the levels 56 of the amount of sanding 48a (see FIG. 3) include: 1—NONE (no sanding) 56a, 2—VERY VERY LIGHT 56b, 3—VERY LIGHT 56c, 4—LIGHT 56d, 5—MEDIUM LIGHT 56e, 6—SEMI-FULL 56f, and 7—FULL 56g. FIG. 13 further shows the roughness measurement plots 158 numbered 1-7.

The results, as shown by the graph 154, showed that roughness measurements 87 measured with the optical interferometer 86 (see FIG. 3) had the ability to detect the level 56 of the amount of sanding 48a, including composite surface treatment 102 (see FIG. 4). In addition, the results, as shown by the graph 154, showed that the curves of the roughness measurement plots 158 were more Gaussian with a greater homogeneous sanded surface. Use of the optical interferometer 86 to measure the roughness 88 (see FIG. 3)

also required significant post signal processing 69 (see FIG. 3) and a slight qualitative assessment of the results. The results showed that using the optical interferometer 86 detected whether the composite surface was sanded or unsanded, and also detected the level of the sanding or sanding surface preparation.

Now referring to FIG. 14, FIG. 14 is an illustration of a perspective front view of a surface analysis tool 60, such as in the form of an optical interferometer 86, taking roughness measurements 87 of an abraded surface 49, such as a sanded surface 49a, after abrading 48 (see FIG. 3), such as sanding 48a (see FIG. 3), of the composite surface 26, such as the test composite surface 26a, of the composite structure 28, such as the test composite structure 28a. As shown in FIG. 14, the surface analysis tool 60, such as in the form of the optical interferometer 86, is a portable surface analysis tool 60a that may be easily moved and manually used to collect the roughness measurements 87.

SUMMARY

The results identified five different surface analysis tools 60—the FTIR spectrometer 66 (see FIGS. 3, 6), the OSEE sensor 70 (see FIGS. 3, 8), the gloss meter 74 (see FIGS. 3, 10), the colorimeter 80 (see FIGS. 3, 12), and the optical interferometer 86 (see FIGS. 3, 14), that were used to set target values 62 (see FIG. 3), or threshold limits, for abrasive surface preparation 42 (see FIG. 3), such as sanding surface preparation 42a (see FIG. 3), with manual sanding 48b (see FIG. 3), using an abrading device 104 (see FIG. 3), such as a random orbital sander 104a (see FIG. 3). The results showed that the use of each of these surface analysis tools 60 successfully detected whether the composite surface was sanded or unsanded, and also successfully detected the level of the sanding or sanding surface preparation. These surface analysis tools 60 defined the operating window and narrowed the limits on sanding parameters. Utilization of these surface analysis tools 60 enables better process control, resulting in robust and reliable bonding.

Figure 15:
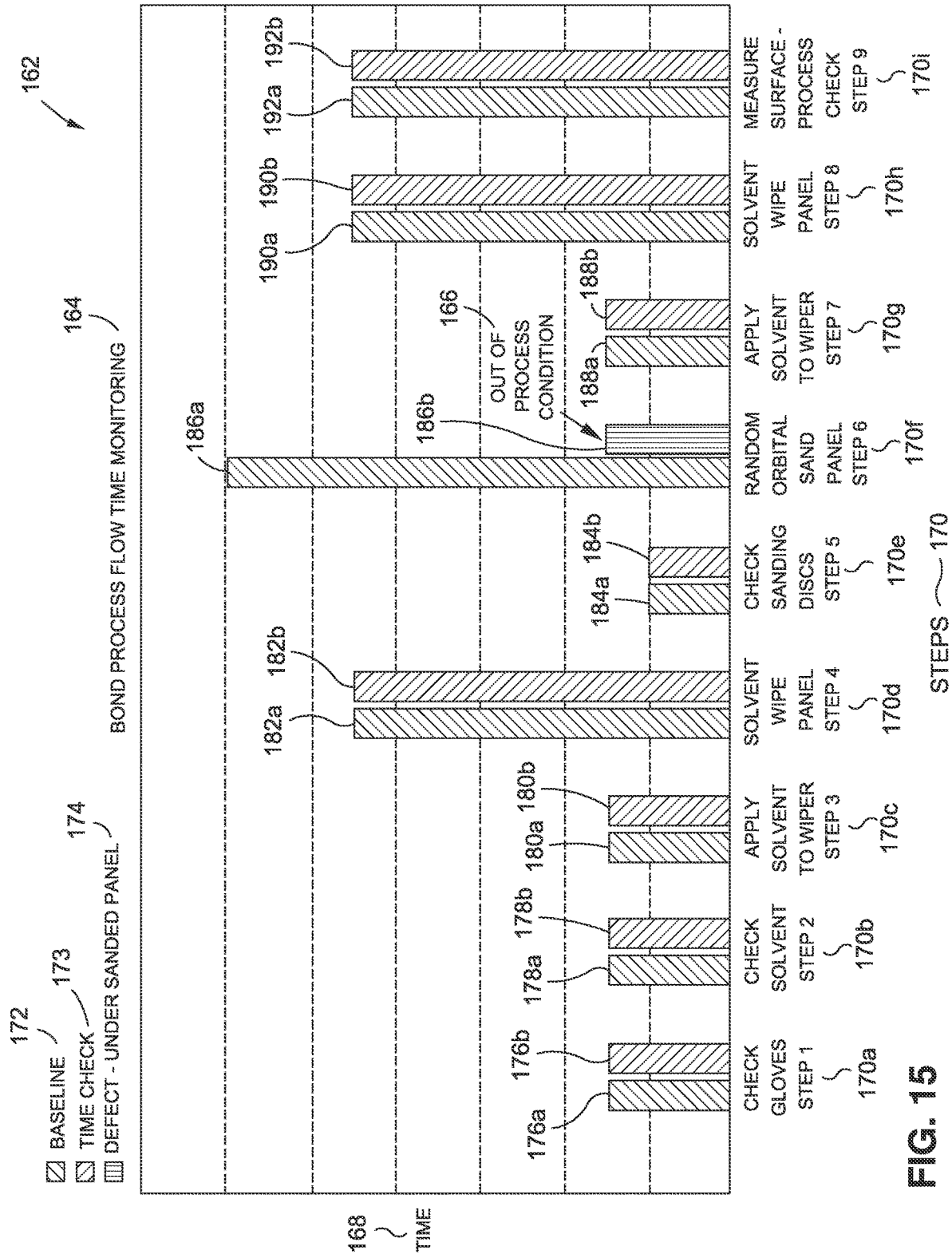
FIG. 15 is an illustration of a graph of an exemplary bond process flow time monitoring showing an out of process condition.

Now referring to FIG. 15, FIG. 15 is an illustration of a graph 162 of an exemplary bond process flow time monitoring 164 showing an out of process condition 166, in the form of a defect—under sanded panel 174. Tracking process flow time is another method of assessing bond process reliability and consistency. If a process step falls outside the normal, known flow time, it is flagged. An example of an output from the bond process flow time monitoring 164 is shown in FIG. 15, where the identification of a defect—under sanded panel 174 is made.

As shown in FIG. 15, the graph 162 shows time 168 on the y-axis, and shows steps 170 of the exemplary bond process flow time monitoring 164 on the x-axis. As further shown in FIG. 15, the steps 170 include step 1—check gloves 170a, step 2—check solvent 170b, step 3—apply solvent to wiper 170c, step 4—solvent wipe panel 170d, step 5—check sanding discs 170e, step 6—random orbital sand panel 170f, step 7—apply solvent to wiper 170g, step 8—solvent wipe panel 170h, and step 9—measure surface-process check 170i. As further shown in FIG. 15, each step 170 is designed to include a baseline 172, and designed to include a time check 173 that should meet, or be equal to, the baseline 172. For example, as shown in FIG. 15, step 1—check gloves 170a includes a baseline plot 176a and a time check plot 176b that are equal; step 2—check solvent 170b includes a baseline plot 178a and a time check plot 178b that are equal; step 3—apply solvent to wiper 170c includes a baseline plot 180a and a time check plot 180b that are equal; step 4—solvent wipe panel 170d includes a baseline plot 182a and a time check plot 182b that are equal; step 5—check sanding discs 170e includes a baseline plot 184a and a time check plot 184b that are equal; step 7—apply solvent to wiper 170g includes a baseline plot 188a and a time check plot 188b that are equal; step 8—solvent wipe panel 170h includes a baseline plot 190a and a time check plot 190b that are equal; and step 9—measure surface-process check 170i includes a baseline plot 192a and a time check plot 192b that are equal. However, as shown by FIG. 15, step 6—random orbital sand panel 170f includes a baseline plot 186a that is not the same as, or equal to, a plot 186b which indicates the defect—under sanded panel 174 and is the out of process condition 166.

The measurements 64 (see FIG. 3), such as the test result measurements 64a (see FIG. 3) of the surface analysis tools 60 used in the method 10 (see FIG. 1), the quantitative method 10a (see FIG. 2), and the system 90 (see FIG. 3), discussed above, provide for a go/no go process tool after the abrasive surface preparation 42 (see FIG. 3), such as the sanding surface preparation 42a (see FIG. 3), of the composite surface 26 (see FIG. 3), such as the test composite surface 26a (see FIG. 3). The pre-bond surface check of the composite surface 26, with the surface analysis tools 60, may be incorporated into an optically enhanced bonding workstation, or, for example, may be incorporated into a method of monitoring and verifying a manufacturing process, as disclosed in U.S. Pat. No. 9,591,273, the content of which is hereby incorporated by reference in its entirety.

Preferably, the surface analysis tools 60 (see FIG. 3) and the monitoring outputs of the surface analysis tools 60 are integrated into the process control system 90a (see FIG. 3). The intent of the stepwise bond process control development is its implementation in the actual production of bonded parts, for example, the optically enhanced bonding work station. The functionality of the system 90 (see FIG. 3) includes process flow time monitoring, documentation of the process steps, as well as in-line process checks.

Figure 16:
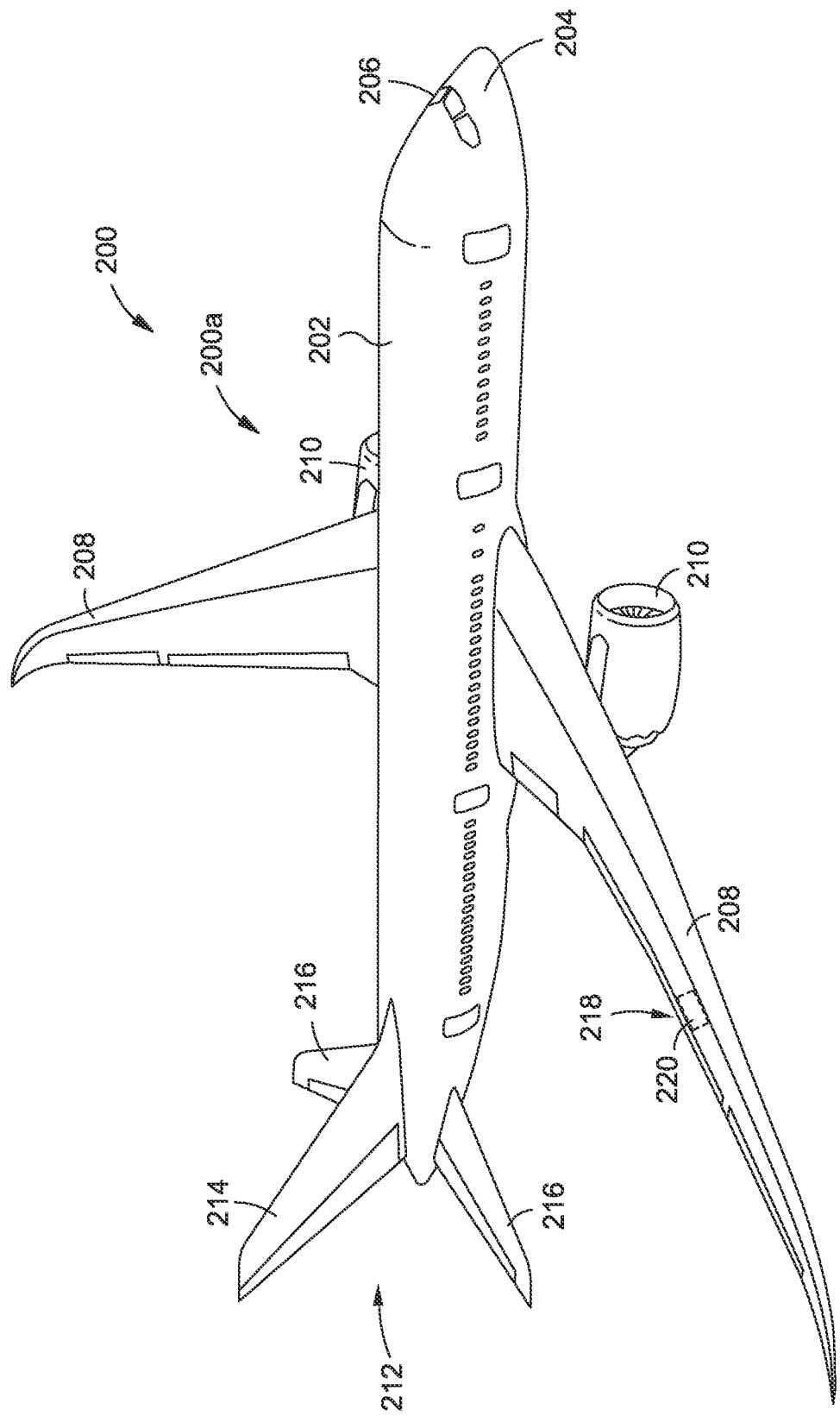
FIG. 16 is an illustration of a perspective view of an air vehicle incorporating one or more parts that may be manufactured using an exemplary version of an in-line process control check of the disclosure.

Now referring to FIG. 16, FIG. 16 is an illustration of a perspective view of an air vehicle 200, such as in the form of aircraft 200a, that incorporates one or more parts 218, such as one or more bonded parts 220, manufactured using an exemplary version of an in-line process control check 92 (see FIG. 4) of the disclosure.

As shown in FIG. 16, the air vehicle 200, such as in the form of aircraft 200a, comprises a fuselage 202, a nose 204, a cockpit 206, wings 208, engines 210, and an empennage 212 comprising a vertical stabilizer 214 and horizontal stabilizers 216. The air vehicle 200 (see FIG. 16), such as in the form of aircraft 200a (see FIG. 16), comprises one or more parts 218, such as the one or more bonded parts 220, installed within the aircraft 200a, or alternatively, installed in the engines 210, the wings 208, the empennage 212, or other suitable areas of the aircraft 200a.

Figure 17:
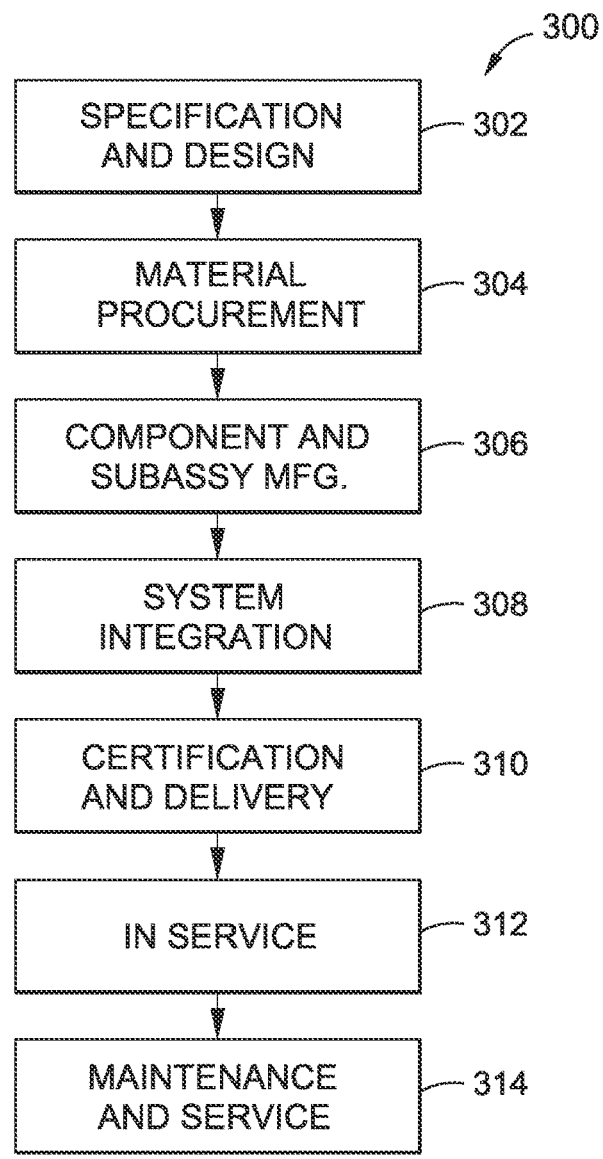
FIG. 17 is an illustration of a flow diagram of an exemplary aircraft manufacturing and service method.
Figure 18:
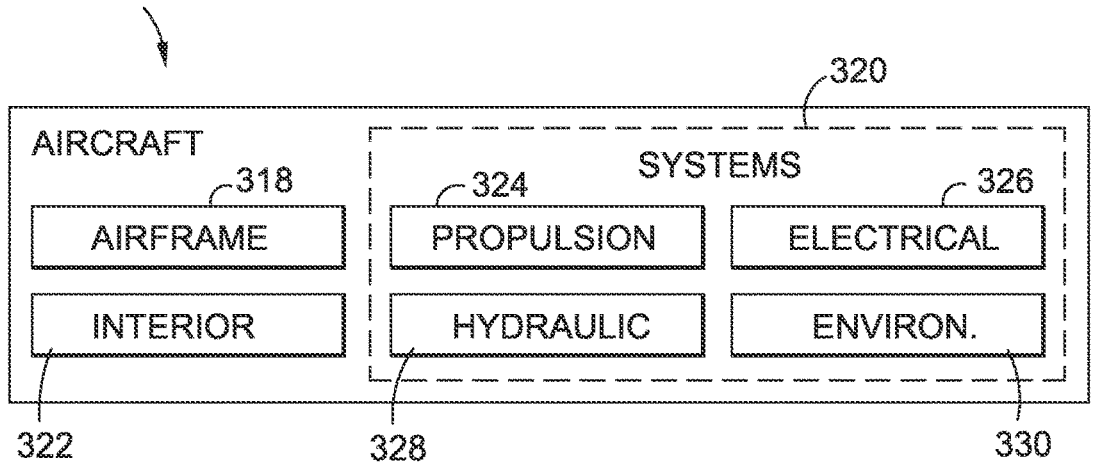
FIG. 18 is an illustration of an exemplary block diagram of an aircraft.

Now referring to FIGS. 17 and 18, FIG. 17 is an illustration of a flow diagram of an exemplary aircraft manufacturing and service method 300, and FIG. 18 is an illustration of an exemplary block diagram of an aircraft 316. Referring to FIGS. 17 and 18, versions of the disclosure may be described in the context of the aircraft manufacturing and service method 300 as shown in FIG. 17, and the aircraft 316 as shown in FIG. 18.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 18, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the method 10 (see FIG. 1), the quantitative method 10*a* (see FIG. 2), and the system 90 (see FIG. 3) provide for the detection of a level 55, such as a test result level 58 (see FIG. 3) of abrasive surface preparation 42 (see FIG. 3), such as sanding surface preparation 42*a* (see FIG. 3), grit blasting surface preparation, nylon pad abrasive surface preparation, or another suitable abrasive surface preparation with an abrasive media tool that physically abrades the composite surface 26 (see FIG. 3), to prevent under sanding or over sanding of the composite surface 26, prior to a post-processing operation 50 (see FIG. 3), such as bonding 52 (see FIG. 3) or painting 53 (see FIG. 3), and to result in robust, consistent, and reliable bonding 52 or painting 53, such as adhesion painting, through process control. A series of portable, pre-bond surface analysis tools 60, including the FTIR spectrometer 66 (see FIGS. 3, 6), the OSEE sensor 70 (see FIGS. 3, 8), the gloss meter 74 (see FIGS. 3, 10), the colorimeter 80 (see FIGS. 3, 12), and the optical interferometer 86 (see FIGS. 3, 14), may be used for in-line bond process control of abrading 48 (see FIG. 3), such as sanding 48*a*, of composite surfaces 26, such as epoxy composite surfaces 26*c* (see FIG. 3). The surface analysis tools 60 detect target values 62 (see FIG. 3), or threshold limits, for a plurality of levels 55 (see FIG. 3) of abrasive surface preparation 42 (see FIG. 3), such as sanding surface preparation 42*a* (see FIG. 3), using Fourier transform infrared spectroscopy (FTIR), optically stimulated electron emissions (OSEE), gloss, color, and roughness analysis of composite surfaces 26 (see FIG. 3) that have been abraded 48 (see FIG. 3) or sanded 48*a* (see FIG. 3).

In addition, disclosed versions of the method 10 (see FIG. 1), the quantitative method 10*a* (see FIG. 2), and the system 90 (see FIG. 3) provide for the use of surface analysis tools 60, including the FTIR spectrometer 66 (see FIGS. 3, 6), the OSEE sensor 70 (see FIGS. 3, 8), the gloss meter 74 (see FIGS. 3, 10), the colorimeter 80 (see FIGS. 3, 12), and the optical interferometer 86 (see FIGS. 3, 14), in a quality assurance methodology, or for incorporation into an optically enhanced bonding workstation. Quantitative measurement of abrasive surface preparation 42 (see FIG. 3), such as sanding surface preparation 42*a* (see FIG. 3), grit blasting surface preparation, nylon pad abrasive surface preparation, or another suitable abrasive surface preparation with an abrasive media tool that physically abrades the composite surface 26 (see FIG. 3) ensures the quality 24 (see FIG. 3) of subsequent adhesive bonding of the composite surface 26 to another structure 40 (see FIG. 3), such as an aircraft structure 40*a* (see FIG. 3).

Moreover, disclosed versions of the method 10 (see FIG. 1), the quantitative method 10*a* (see FIG. 2), and the system 90 (see FIG. 3) may provide a reduced variability in abrasive surface preparation 42 methods, to produce robust bonded joints and robust bonded parts 220 (see FIG. 16), and to promote reliable adhesion, and to ensure that the composite surface 26 (see FIG. 3) has been properly prepared before the post-processing operation 50 (see FIG. 3), such as bonding 52 (see FIG. 3) or painting 53 (see FIG. 3). Further, disclosed versions of the method 10 (see FIG. 1), the quantitative method 10*a* (see FIG. 2), and the system 90 (see FIG. 3) may mitigate any risks associated with bond processing through an in-line bond process monitoring system, and may define the processing window and control the fabrication steps to ensure a repeatable, reliable, and consistent bonding process, and define the quantitative outputs from the surface analysis tool measurements and outputs for integration into the process control system 90*a* (see FIG. 3) as "go/no go" process checks. The intention of the in-line process control check 92 (see FIG. 3) is definition and control of process limits, resulting in consistent and reliable production of robust bonds. Disclosed versions of the method 10 (see FIG. 1), the quantitative method 10*a* (see FIG. 2), and the system 90 (see FIG. 3) provide a framework on how to carry out implementation of bond process control.

In addition, disclosed versions of the method 10 (see FIG. 1), the quantitative method 10*a* (see FIG. 2), and the system 90 (see FIG. 3) provide a framework for implementation of bond process control on any bonding system and ultimately allow for certification of robust bonded structures and bonded parts 220 (see FIG. 16) and safeguard the quality of aircraft structural adhesive bonds. Any aerospace manufacturer, or other manufacturer, such as an automotive manufacturer, that utilizes abrading, sanding, grit blasting, nylon pad abrasive surface preparation, or another suitable abrasive surface preparation of composite surfaces may have the ability to utilize disclosed versions of the method 10 (see FIG. 1), the quantitative method 10*a* (see FIG. 2), and the system 90 (see FIG. 3). Disclosed versions of the method 10 (see FIG. 1), the quantitative method 10*a* (see FIG. 2), and the system 90 (see FIG. 3) may enable rapid certification of bonded structures and bonded parts 220 (see FIG. 16) by validating robust and reliable bond processing, such as aircraft structural adhesive bond processing, prior to launching certification testing. Further, disclosed versions of the method 10 (see FIG. 1), the quantitative method 10a (see FIG. 2), and the system 90 (see FIG. 3) provide an approach that may be used to verify or certify the integrity of structural bonds for various applications, such as transportation applications, including aircraft, automotive, and water craft; architectural, including buildings and bridges; and other suitable applications requiring verification or certification of the integrity of structural bonds.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation.

What is claimed is:

1. A quantitative method for determining a level of a sanding surface preparation of a carbon fiber composite surface, prior to the carbon fiber composite surface undergoing a post-processing operation, the quantitative method comprising:
    fabricating a ladder panel of a plurality of levels of sanding correlating to an amount of sanding of sanding surface preparation standards for a reference carbon fiber composite surface of one or more reference carbon fiber composite structures;
    using one or more surface analysis tools comprising one of, a Fourier transform infrared (FTIR) spectrometer, an optically stimulated electron emission (OSEE) sensor, or an optical interferometer, to create one or more target values for quantifying each of the plurality of levels of sanding of the sanding surface preparation standards;
    measuring, with the one or more surface analysis tools, one or more sanding surface preparation locations on the carbon fiber composite surface of a test carbon fiber composite structure, to obtain one or more test result measurements;
    comparing each of the one or more test result measurements to the plurality of levels of sanding of the sanding surface preparation standards, to obtain one or more test result levels of the sanding surface preparation of the test carbon fiber composite structure;
    determining if the one or more test result levels of the sanding surface preparation meet the one or more target values, to determine whether the carbon fiber composite surface is sanded or unsanded, and to determine the level of sanding correlating to the amount of sanding of the sanding surface preparation of the carbon fiber composite surface; and
    determining whether the carbon fiber composite surface of the test carbon fiber composite structure is acceptable to proceed with undergoing the post-processing operation.

2. The quantitative method of claim 1, wherein fabricating the ladder panel of the plurality of levels of sanding further comprises, fabricating the ladder panel of the plurality of levels of sanding correlating to the amount of sanding, the plurality of levels of sanding comprising, no sanding, very very light sanding, very light sanding, light sanding, medium light sanding, semi-full sanding, and full sanding.

3. The quantitative method of claim 1, wherein using the one or more surface analysis tools further comprises, manually using the one or more surface analysis tools comprising portable surface analysis tools that are hand-held.

4. The quantitative method of claim 1, wherein measuring, with the one or more surface analysis tools, further comprises, measuring with the Fourier transform infrared (FTIR) spectrometer, to measure one or more Fourier transform infrared (FTIR) signal measurements of the one or more sanding surface preparation locations on the carbon fiber composite surface, to obtain an infrared (IR) spectra of absorption or emission of the one or more sanding surface preparation locations of the carbon fiber composite surface of the test carbon fiber composite structure.

5. The quantitative method of claim 1, wherein measuring, with the one or more surface analysis tools, further comprises, measuring with the Fourier transform infrared (FTIR) spectrometer, to expose the one or more sanding surface preparation locations on the carbon fiber composite surface to an infrared (IR) light source that is reflected onto a detector that measures an amount of light absorbed by the one or more sanding surface preparation locations on the carbon fiber composite surface, to detect the one or more test result levels of the sanding surface preparation of the test carbon fiber composite structure.

6. The quantitative method of claim 1, wherein measuring, with the one or more surface analysis tools, further comprises, measuring with the optically stimulated electron emission (OSEE) sensor, to measure one or more optically stimulated electron emission (OSEE) signal measurements of the one or more sanding surface preparation locations on the carbon fiber composite surface, by using ultraviolet (UV) light to create electron emission from the one or more sanding surface preparation locations on the carbon fiber composite surface.

7. The quantitative method of claim 1, wherein measuring, with the one or more surface analysis tools, further comprises, measuring with the optically stimulated electron emission (OSEE) sensor, where the OSEE sensor uses compressed gas comprising compressed argon gas.

8. The quantitative method of claim 1, wherein measuring, with the one or more surface analysis tools, further comprises, measuring with the optical interferometer, to measure one or more roughness measurements of the one or more sanding surface preparation locations on the carbon fiber composite surface, the one or more roughness measurements comprising one or more of, arithmetical mean roughness, and mean roughness depth.

9. The quantitative method of claim 1, wherein determining whether the carbon fiber composite surface of the test carbon fiber composite structure is acceptable to proceed with undergoing the post-processing operation further comprises, determining whether the carbon fiber composite surface is acceptable to proceed with undergoing the post-processing operation comprising one or more of:
    bonding the carbon fiber composite surface to a structure, the bonding comprising one of, paste bonding, or adhesive bonding; and
    painting the carbon fiber composite surface with a paint.

10. The quantitative method of claim 1, wherein using the one or more surface analysis tools further comprises, using the one or more surface analysis tools as an in-line process control check in a real time process control system, to provide a pre-bond surface check of the carbon fiber composite surface of the test carbon fiber composite structure.

11. A quantitative method for determining a level of a sanding surface preparation of a carbon fiber composite surface, prior to bonding the carbon fiber composite surface to an aircraft composite structure, the quantitative method comprising:

fabricating a ladder panel of a plurality of levels of sanding correlating to an amount of sanding of sanding surface preparation standards for a reference carbon fiber composite surface of one or more reference carbon fiber composite structures;

using one or more surface analysis tools to create one or more target values for quantifying each of the plurality of levels of sanding of the sanding surface preparation standards, wherein the one or more surface analysis tools comprise one of, a Fourier transform infrared (FTIR) spectrometer, an optically stimulated electron emission (OSEE) sensor, or an optical interferometer;

measuring, with the one or more surface analysis tools, one or more sanding surface preparation locations on the carbon fiber composite surface of a test carbon fiber composite structure, to obtain one or more test result measurements;

comparing each of the one or more test result measurements to the plurality of levels of sanding of the sanding surface preparation standards, to obtain one or more test result levels of the sanding surface preparation of the test carbon fiber composite structure;

determining if the one or more test result levels of the sanding surface preparation meet the one or more target values, to determine whether the carbon fiber composite surface is sanded or unsanded, and to determine the level of sanding correlating to the amount of sanding of the sanding surface preparation of the carbon fiber composite surface; and determining whether the carbon fiber composite surface of the test carbon fiber composite structure is acceptable to proceed with bonding to the aircraft composite structure.

12. The quantitative method of claim 11, wherein measuring, with the one or more surface analysis tools, further comprises, measuring with the Fourier transform infrared (FTIR) spectrometer, to measure one or more Fourier transform infrared (FTIR) signal measurements of the one or more sanding surface preparation locations on the carbon fiber composite surface, to obtain an infrared (IR) spectra of absorption or emission of the one or more sanding surface preparation locations of the carbon fiber composite surface of the test carbon fiber composite structure.

13. The quantitative method of claim 11, wherein measuring, with the one or more surface analysis tools, further comprises, measuring with the optically stimulated electron emission (OSEE) sensor, to measure one or more optically stimulated electron emission (OSEE) signal measurements of the one or more sanding surface preparation locations on the carbon fiber composite surface, by using ultraviolet (UV) light to create electron emission from the one or more sanding surface preparation locations on the carbon fiber composite surface.

14. The quantitative method of claim 11, wherein measuring, with the one or more surface analysis tools, further comprises, measuring with the optical interferometer, to measure one or more roughness measurements of the one or more sanding surface preparation locations on the carbon fiber composite surface, the one or more roughness measurements comprising one or more of, arithmetical mean roughness, and mean roughness depth.

15. A quantitative system for determining a level of a sanding surface preparation of a carbon fiber composite surface, prior to the carbon fiber composite surface undergoing a post-processing operation, the quantitative system comprising:

one or more reference carbon fiber composite structures having a reference carbon fiber composite surface;

a ladder panel of a plurality of levels of sanding correlating to an amount of sanding of sanding surface preparation standards fabricated for the reference carbon fiber composite surface;

a test carbon fiber composite structure having the carbon fiber composite surface, and the carbon fiber composite surface having one or more sanding surface preparation locations that have been sanded with an abrading device; and one or more surface analysis tools comprising one of, a Fourier transform infrared (FTIR) spectrometer, an optically stimulated electron emission (OSEE) sensor, or an optical interferometer, to create one or more target values for quantifying each of the plurality of levels of the sanding surface preparation standards, and the one or more surface analysis tools configured to measure the one or more sanding surface preparation locations, to obtain one or more test result measurements, wherein each of the one or more test result measurements is compared to the plurality of levels of sanding of the sanding surface preparation standards, to obtain one or more test result levels of the sanding surface preparation of the test carbon fiber composite structure, and to determine if the one or more test result levels meet the one or more target values, to determine whether the carbon fiber composite surface is sanded or unsanded, and to determine the levels of sanding correlating to the amount of sanding of the sanding surface preparation of the carbon fiber composite surface, and to determine if the carbon fiber composite surface is acceptable to proceed with undergoing the post-processing operation.

16. The quantitative system of claim 15, wherein the Fourier transform infrared (FTIR) spectrometer measures one or more Fourier transform infrared (FTIR) signal measurements of the one or more sanding surface preparation locations on the carbon fiber composite surface, to obtain an infrared (IR) spectra of absorption or emission of the one or more sanding surface preparation locations of the carbon fiber composite surface of the test carbon fiber composite structure.

17. The quantitative system of claim 15, wherein the optically stimulated electron emission (OSEE) sensor measures one or more optically stimulated electron emission (OSEE) signal measurements of the carbon fiber composite surface, by using ultraviolet (UV) light to create electron emission from the one or more sanding surface preparation locations on the carbon fiber composite surface.

18. The quantitative system of claim 15, wherein the optical interferometer measures one or more roughness measurements of the one or more sanding surface preparation locations on the carbon fiber composite surface, the one or more roughness measurements comprising one or more of, arithmetical mean roughness, and mean roughness depth.

19. The quantitative system of claim 15, wherein the abrading device comprises a random orbital sander having a 180 grit aluminum oxide sand paper.

20. The quantitative system of claim 15, wherein the test carbon fiber composite structure comprises a carbon fiber epoxy composite panel.

* * * * *